(12) United States Patent
Lee et al.

(10) Patent No.: US 11,874,474 B1
(45) Date of Patent: Jan. 16, 2024

(54) OPTICAL SYSTEM FOR MULTI-VIEW EYE-TRACKING

(71) Applicant: Meta Platforms Technologies, LLC, Menlo Park, CA (US)

(72) Inventors: Yun-Han Lee, Redmond, WA (US); Mengfei Wang, Seattle, WA (US); Junren Wang, Mercer Island, WA (US); Lu Lu, Kirkland, WA (US); Robin Sharma, Redmond, WA (US); Gregory Olegovic Andreev, Kirkland, WA (US); Garam Young, Sunnyvale, CA (US); Andrew John Ouderkirk, Kirkland, WA (US); Babak Amirsolaimani, Redmond, WA (US); Fenglin Peng, Redmond, WA (US); Barry David Silverstein, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 433 days.

(21) Appl. No.: 17/018,579

(22) Filed: Sep. 11, 2020

Related U.S. Application Data

(60) Provisional application No. 62/907,351, filed on Sep. 27, 2019.

(51) Int. Cl.
*G02B 27/01* (2006.01)
*G02B 27/42* (2006.01)
*G02B 27/28* (2006.01)
*G02F 1/31* (2006.01)
*H04N 23/55* (2023.01)
*H04N 23/75* (2023.01)

(52) U.S. Cl.
CPC ..... *G02B 27/0179* (2013.01); *G02B 27/0172* (2013.01); *G02B 27/283* (2013.01); *G02B 27/286* (2013.01); *G02B 27/4205* (2013.01); *G02F 1/31* (2013.01); *H04N 23/55* (2023.01); *H04N 23/75* (2023.01); *G02B 2027/011* (2013.01); *G02B 2027/0138* (2013.01); *G02B 2027/0187* (2013.01); *G02F 2203/01* (2013.01); *G02F 2203/07* (2013.01); *G02F 2203/24* (2013.01)

(58) Field of Classification Search
CPC ............ G02B 27/0179; G02B 27/0172; G02B 27/283; G02B 27/286
USPC .......................................................... 348/78
See application file for complete search history.

(56) References Cited

U.S. PATENT DOCUMENTS 10,816,939 B1 * 10/2020 Coleman ................. G01S 17/86
2017/0307887 A1 * 10/2017 Stenberg ............ G02B 26/0808

* cited by examiner

*Primary Examiner* — On S Mung
(74) *Attorney, Agent, or Firm* — MILLBURN IP PLLC

(57) ABSTRACT

A system includes a diffractive optical element including at least one substrate and a grating structure. The grating structure is configured to diffract a first light having an incidence angle within a predetermined range, and the at least one substrate is configured to reflect a second light. The system also includes a polarization selective mechanism configured to generate images based on the first light and the second light, respectively.

20 Claims, 16 Drawing Sheets

OPTICAL SYSTEM FOR MULTI-VIEW EYE-TRACKING

CROSS-REFERENCE TO RELATED APPLICATION

This application claims the benefit of priority to U.S. Provisional Patent Application No. 62/907,351, filed on Sep. 27, 2019, the entire content of which is incorporated by reference.

BACKGROUND

Near-eye display ("NED") has been widely used in, e.g., video playback, gaming, and sports. NEDs have been used to realize virtual reality ("VR"), augmented reality ("AR"), or mixed reality ("MR"). Some VR, AR, or MR applications require an eye tracking function that monitors the eye of the user and/or the region surrounding the eye of the user. By monitoring the eye and/or the surrounding region, the NED can determine a gaze direction of the user, which can be used for improving display quality, performance, and/or user experience, and for addressing a vergence-accommodation conflict. Further, by monitoring the eye and/or the surrounding region, the NED can estimate the psychological state and/or changes in the psychological state of the user, as well as physical characteristics of the user. Such information can be used by the NED to, e.g., determine what content to provide to the user. For example, if the user is concentrating on a particular task or activity, the NED may determine that the user prefers not to be interrupted with other information unless such information would be important to the user.

SUMMARY OF THE DISCLOSURE

One aspect of the present disclosure provides a system. The system includes a diffractive optical element including at least one substrate and a grating structure. The grating structure is configured to diffract a first light having an incidence angle within a predetermined range, and the at least one substrate is configured to reflect a second light. The system also includes a polarization selective mechanism configured to generate images based on the first light and the second light, respectively.

Another aspect of the present disclosure provides a system. The system includes a light source configured to emit a light to illuminate an object. The system also includes a diffractive optical element configured to receive the light reflected by the object. The diffractive optical element includes at least one substrate and a grating structure. The grating structure is configured to diffract a first light having an incidence angle within a predetermined range. The at least one substrate is configured to reflect a second light. The system further includes a polarization selective mechanism configured to generate images based on the first light and the second light, respectively.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1:
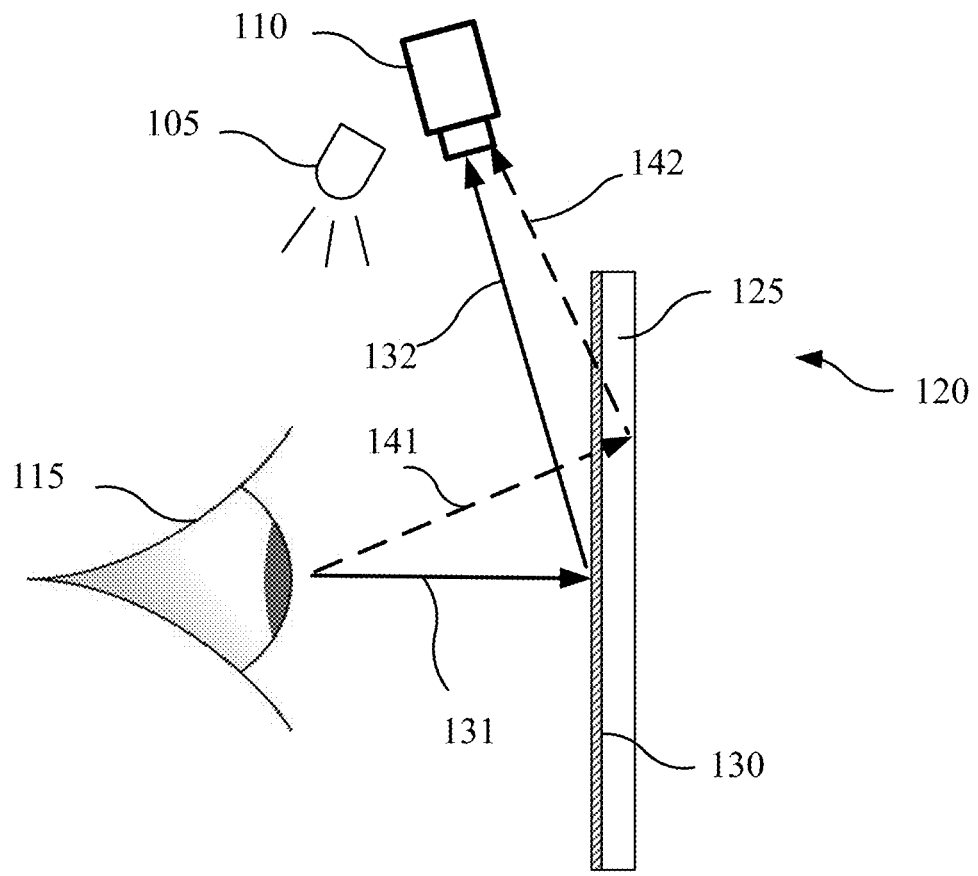
FIG. 1 illustrates an optical system for eye-tracking in a near-eye display ("NED")

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "communicatively coupled" or "communicatively connected" indicates that related items are coupled or connected through an electrical and/or electromagnetic coupling or connection, such as a wired or wireless communication connection, channel, or network.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared wavelength range, or a combination thereof.

The term "processor" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "controller" may encompass any suitable electrical circuit, software, or processor configured to generate a control signal for controlling a device, a circuit, an optical element, etc. A "controller" may be implemented as software, hardware, firmware, or a combination thereof. For example, a controller may include a processor, or may be included as a part of a processor.

The term "eye tracking system" or "eye tracking device" may include an optical sensor, such as a camera, to capture an image of an eye of a user. The eye tracking system or eye tracking device may also include a processor or controller configured to process the image of the eye of the user to obtain eye tracking information. The processor or controller may provide the eye tracking information to another device, or may process the eye tracking information to control another device, such as a grating, a lens, a waveplate, etc. The eye tracking system or eye tracking device may also include a non-transitory computer-readable medium, such as a memory, configured to store data or information, such as the captured image and/or the eye tracking information obtained from processing the captured image.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

Various eye-tracking techniques have been used in NEDs. For example, a light source may emit an infrared ("IR") light to illuminate one or two eyes of a user of the NED. The IR light is not visible to the human eye and, thus, does not distract the user wearing the NED during operation. An optical sensor, such as a camera, may be arranged to receive the IR light reflected by the eye and generate an image of the eye, based on the received IR light. The image of the eye may be used to extract desired information (e.g., gaze direction, movement direction, psychological state, etc.) of the eye. An eye-tracking optical element such as a grating may be arranged facing the eye and the optical sensor, and the IR light reflected by the eye may be diffracted by the grating towards the optical sensor.

When the IR light reflected by the eye is incident onto the grating at an oblique angle, surface reflection may occur at a substrate surface of the grating. Some of the surface reflection may be received by the optical sensor (e.g., camera) and some may be out of the receiving area or coverage area of the optical sensor. The surface reflection received by the optical sensor (referred to as a secondary signal light) may generate a secondary eye-tracking signal in addition to a primary eye-tracking signal generated based on the IR light propagating in a signal path (referred to as a primary signal light), where the IR light reflected by the eyes is substantially normally incident onto the grating with negligible surface reflection and then diffracted by the grating. For example, the optical sensor may generate a brighter primary image of the eye superimposed with a darker secondary image.

In some embodiments, the secondary image may be considered as a ghost image, which may reduce the signal-to-noise ratio of the eye-tracking signal and degrade the accuracy of the eye-tracking. However, the inventors discovered that the primary eye-tracking signal resulting from the diffraction of the grating and the secondary eye-tracking signal resulting from the surface reflection of the various optical elements in the eye-tracking system may be utilized to provide multiple perspective views of the eyes through a polarization selective mechanism, thereby increasing the accuracy of eye tracking, especially when the user's eye moves, and enhance the user experience.

In view of this, the present disclosure provides an optical system that provides a multi-view object tracking, such as eye-tracking, based on time- and/or spatial-multiplexing of a primary object-tracking signal resulting from the diffraction, by a grating, of a light reflected or scattered by an object and incident onto the grating, and a secondary object-tracking signal resulting from the surface reflection by various optical elements including the grating in the object-tracking system, of the light reflected or scattered by the object and incident onto the various optical elements. The inventors have discovered that when a diffracted light (referred to as the primary signal light, which is a light diffracted by a grating) and a surface reflection light (referred to as the secondary signal light, which is a light reflected by a surface of an optical element, including the grating) having different polarizations are separated, or when separate images primarily based on the diffracted light without and with surface reflection light are generated respectively, additional object-tracking information may be extracted to enhance the accuracy the object tracking. The optical system may be used to enhance the object-tracking accuracy in optical systems (e.g., NEDs) for AR, VR and/or MR applications. In the following descriptions and in the drawings, eye-tracking is used as an example of the object tracking. That is, the object to be tracked is one or both eyes of a user. It is understood that the object to be tracked can be any other suitable object. The disclosed systems and methods can be implemented in applications other than eye-tracking.

The optical system may include a polarization selective mechanism configured to separate the diffracted light (i.e., the primary signal light) and the surface reflection light (i.e., the secondary signal light), or configured to separate images generated primarily based on the diffracted light without and with the surface reflection light, respectively, thereby utilizing the surface reflection light received by the optical sensor to construct additional images and/or to extract additional information relating to the tracked object for enhancing the tracking accuracy. For example, when the optical system is used for eye-tracking, the optical system may generate a secondary image of the eye primarily based on the surface reflection light (or extract an image generated primarily based on the surface reflection light) in addition to a primary image of the eye generated primarily based on the diffracted light, thereby providing different perspective views of the eye. For example, additional information relating to the eye may be obtained from the secondary image, thereby improving the accuracy of the eye-tracking and enhancing the user experience. In some embodiments, the polarization selective mechanism may include a polarization converter, a polarizer, and an optical sensor arranged in an optical series. In some embodiments, the polarization selective mechanism may include a polarization selective steering assembly and an optical sensor arranged in an optical series. In some embodiments, the polarization selective mechanism may include an optical sensor that is a pixelated polarized camera.

Although not shown in the figures, an object-tracking system (e.g., an eye-tracking system) disclosed herein in accordance with various embodiments may include a processor configured to perform various information, including image data or lights, to generate images, analyze images, identify features of the tracked object (e.g., eye). In addition, although not shown in the figures, the object-tracking system (e.g., the eye-tracking system) may include a non-statutory computer-readable medium (e.g., a memory, a hard disk, a solid state disk, etc.) configured to store computer-executable codes or instructions, which when executed by the processor, cause the processor to perform various methods disclosed herein, such as generating images, analyzing images, identifying features from the images, etc.

FIG. 1 illustrates an optical system 100, according to an embodiment of the present disclosure. In some embodiments, the optical system 100 may be implemented in an NED. The optical system 100 may generate images by utilizing lights emitted or reflected by a target being tracked, such as the eye of a user. For discussion purpose, such an optical system 100 is referred to as an eye-tracking system in the following descriptions. The eye is used as an example of the object that is tracked. The eye-tracking system (or method) is described herein as an example of the object-tracking system (or method). It is understood that the optical system 100 may be used to track a target or an object other than the eye of the user. In some embodiments, the eye-tracking system 100 may include a light source 105 configured to emit a light to illuminate one or two eyes 115 of a user. The light source 105 may be positioned out of a line of sight of the user (e.g., below the eye 115). FIG. 1 shows one eye 115 for illustrative purposes. It is understood that components for tracking the eye 115 may be replicated for tracking the other eye of the user, which are omitted in FIG. 1.

In some embodiments, the lights emitted by the light source 105 may include a narrow spectrum or a relatively broad spectrum, and one or more wavelengths of the lights may be in the infrared ("IR") spectrum, i.e., the spectrum of the light source 105 may be within, overlap, or encompass at least a portion of the IR spectrum. In some embodiments, the light source 105 may emit lights in the near infrared ("NIR") band or spectrum (about 750 nm to 1250 nm), or some other portion of the electromagnetic spectrum. NIR spectrum lights may be advantageous in some applications because the NIR spectrum lights are not visible to the human eye and thus, do not distract the user wearing the NED during operations. The IR lights may be reflected by a pupil area, of the eye 115, the entire eye 115 of the user, an area near, such as above, below, left to, or right to, the eye 115 of the user, or an area including the eye 115 and the area near the eye 115, including the eye lid and/or the facial skins around the eye 115.

The eye-tracking system 100 may include a diffractive optical element 120 configured to direct the lights reflected by the eye 115 towards an optical sensor 110. The diffractive optical element 120 may be referred to as a grating. The optical sensor 110 may be arranged facing the diffractive optical element 120, and configured to receive the lights directed by the diffractive optical element 120 and generate a signal or information based on the received lights for eye-tracking, such as an image of the eye 115. The optical sensor 110 may be sensible to lights having a wavelength within a spectrum that includes at least a portion of the IR spectrum. In some embodiments, the optical sensor 110 may be sensible to IR lights but not visible lights. In some embodiments, the optical sensor 110 may include a camera, such as one or more of a charge-coupled device ("CCD") camera, a complementary metal-oxide-semiconductor ("CMOS") sensor, an N-type metal-oxide-semiconductor ("NMOS") sensor, a pixelated polarized camera, or any other suitable cameras.

Further, the optical sensor 110 may include a processor configured to process the IR lights, to generate an image of the eye 115, and/or to analyze the image of the eye 115 to obtain information that may be used for eye-tracking and other subsequent operations, such as for determining what information to present to the user or the layout of the presentation of the information, etc. In some embodiments, the optical sensor 110 may also include a non-transitory computer-readable storage medium (e.g., a computer-readable memory) configured to store data, such as the generated images. In some embodiments, the non-transitory computer-readable storage medium may store codes or instructions that may be executable by the processor to perform various steps of any methods disclosed herein. In some embodiments, the processor and the non-transitory computer-readable medium may be provided separately from the optical sensor 110. For example, the eye-tracking system 100 may include a controller communicatively connected with the optical sensor 110 and configured to receive data from the optical sensor 110. The controller may be configured to analyze the data (e.g., images of the eye 115) received from the optical sensor 110 to obtain information for eye-tracking or other purposes.

In some embodiments, the diffractive optical element 120 may include at least one substrate 125 and a plurality of grating structures 130 formed on the at least one substrate 125. The substrate 125 may provide support and protection to the grating structures 130. In some embodiments, the substrate 125 may include a lens or an optical waveguide (or light guide) made of a suitable material, such as glass, plastics, etc. The substrate 125 may be rigid or flexible. In some embodiments, the substrate 125 may also be a part of another optical device or another optoelectrical device. For example, the substrate 125 may be a part of a functional device, such as a display screen. In some embodiments, the grating structures 130 may be formed on or bonded to a surface of the substrate 125. In some embodiments, the grating structures 130 may direct contact the surface of the at least one substrate 125. In some embodiments, the grating structures 130 may be spaced apart from the substrate 125 by a spacing material. In some embodiments, additional layer(s), such as protection layer(s) and/or buffer layer(s), can be arranged between the substrate 125 and the grating structures 130.

The grating structures 130 may include any suitable grating structures. In some embodiments, the grating structures 130 may be grating structures corresponding to a holographic optical element ("HOE"). In some embodiments, the grating structures 130 may be grating structures corresponding to a polarization selective/sensitive grating, such as a polarization volume hologram ("PVH") grating. In some embodiments, the grating structures 130 may be grating structures corresponding to a non-polarization selective/sensitive grating, such as a volume Bragg grating ("VBG"). In some embodiments, the grating structures 130 and the substrate 125 may be made of the same material, and the grating structures 130 and the substrate 125 may be a single component, rather than being separate components. For example, the diffractive optical element 120 may be a VBG where the substrate 125 is a glass block and the grating structures 130 are integrally formed within the glass block. In some embodiments, the grating structures 130 and the substrate 125 may be made of different materials. For example, the diffractive optical element 120 may be a PVH grating where the grating structures 130 is formed by liquid crystal ("LC") materials and the substrate 125 is made of glass or plastic, i.e., the PVH grating may include an LC layer disposed on the substrate. In some embodiments, the grating structures 130 may be microstructures with dimensions in the micron or nano levels.

As shown in FIG. 1, the diffractive optical element 120 may be configured to guide (e.g., transmit, reflect, and/or diffract) the light reflected by the eye 115 into the optical sensor 110. The reflected light may be incident onto the diffractive optical element 120 with various incidence angles, such as 0 degree (i.e., perpendicular to the surface of the diffractive optical element 120), 30 degrees, 45 degrees, 60 degrees, 70 degrees, etc. A reflected light 131 that is substantially normally incident onto the diffractive optical element 120 may be diffracted by the grating structures 130 as a diffracted light 132. The optical sensor 110 may be positioned with a suitable orientation or direction to receive the diffracted light 132, and generate an image of the eye 115 based on the diffracted light 132. The diffracted light 132 may be referred to as a primary signal light or a primary eye-tracking signal. A reflected light 141 having an oblique incidence angle may not be diffracted by the grating structures 130 but may be reflected by a surface of the substrate 125 as a surface reflection light 142. Because the optical sensor 110 is arranged to have a specific light receiving area and light receiving direction, in addition to the primary signal light 132, the optical sensor 110 may also receive the surface reflection light 142. The surface reflection light 142 received by the optical sensor 110 may be referred to as a secondary signal light or a secondary eye-tracking signal. Thus, the optical sensor 110 may receive both the primary signal light 132 and the secondary signal light 142, and may generate a brighter primary image of the eye superimposed with a darker secondary image.

Figure 2:
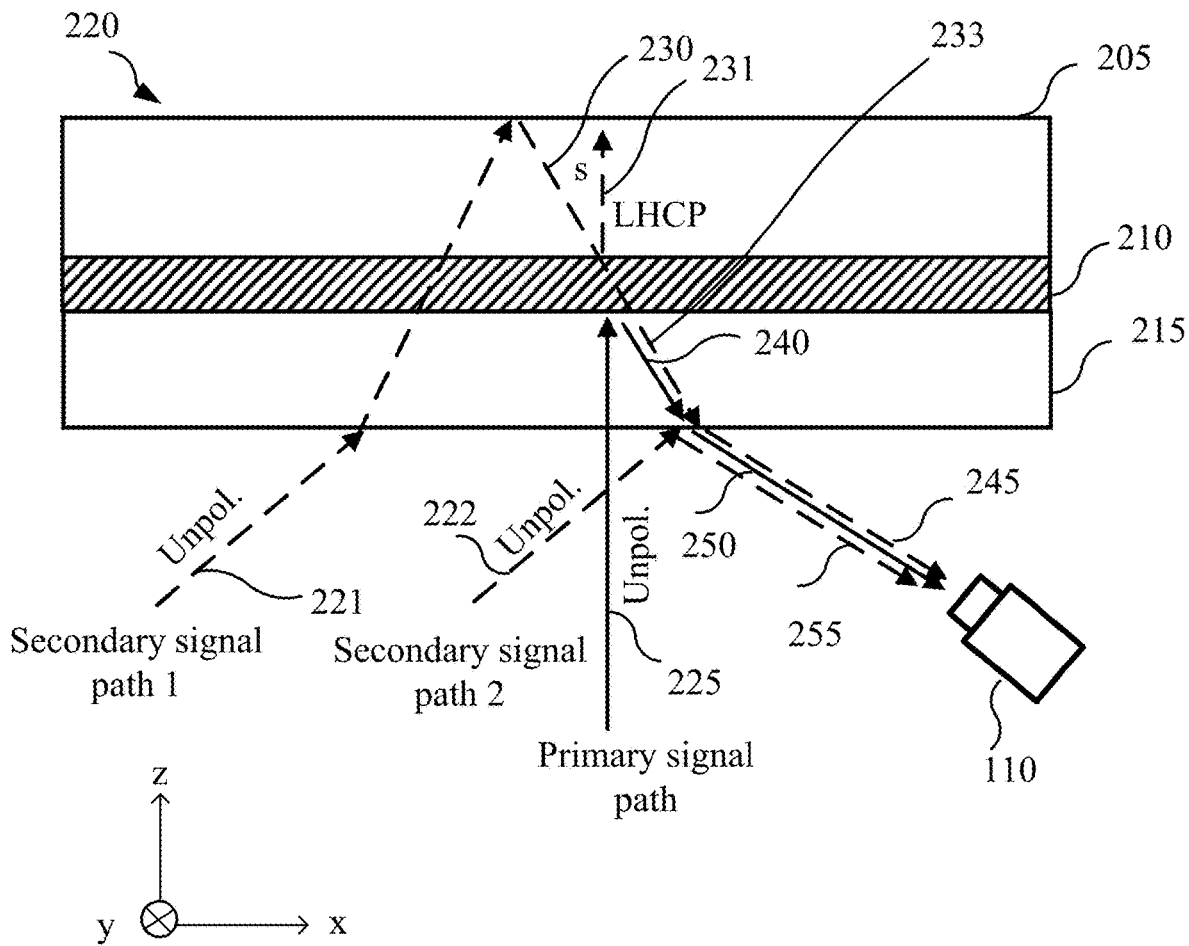
FIG. 2 illustrates a schematic diagram of an eye-tracking system to demonstrate an effect of surface reflection.

FIG. 2 illustrates a schematic diagram of an eye-tracking system 200 to demonstrate an effect of surface reflection. The eye-tracking system 200 may be similar to the eye-tracking system 100, except that a diffractive optical element 220 of the eye-tracking system 200 may include two substrates, a first substrate 205 and a second substrate 215 for supporting and protecting purposes. Each of the first substrate 205 and the second substrate 215 may be similar to the substrate 125 shown in FIG. 1. It is noted that in some embodiments, one of the two substrates may be omitted. That is, the eye-tracking system 200 may include only one substrate, as in the eye-tracking system 100.

The diffractive optical element 220 may include a plurality of grating structures 210 disposed between the first substrate 205 and the second substrate 215. The grating structures 210 may be any suitable grating structures described above in connection with the grating structures 130. In some embodiments, the grating structures 210 may include one or more polarization selective elements, such as one or more polarization selective gratings or holographic elements fabricated based on isotropic or anisotropic materials. The polarization selective gratings or holographic elements may include suitable sub-wavelength structures, liquid crystals, photo-refractive holographic materials, or any combination thereof. In some embodiments, the grating structures 210 may be in a form of a PVH layer, and the diffractive optical element 220 may be a PVH grating. The grating structures 210 may also be referred to as a PVH layer 210. In some embodiments, an optic axis of the PVH layer 210 may be configured with a spatially varying orientation in an in-plane direction to provide a polarization sensitive holographic response. In some embodiments, an optic axis of the PVH layer 210 may be configured with a spatially varying orientation in both an in-plane direction and an out-of-plane direction to provide a polarization sensitive holographic response. The term "optic axis" may refer to a direction in a crystal. A light propagating in the optic axis direction may not experience birefringence (or double refraction). An optic axis may be a direction rather than a single line: lights that are parallel to that direction may experience no birefringence. The PVH layer 210 may be configured to diffract a light via Bragg diffraction. In some embodiments, the PVH layer 210 may be a reflective PVH layer configured to primarily (or substantially) backwardly diffract a circularly polarized light (or an elliptically polarized light) having a predetermined handedness, and primarily (or substantially) transmit (e.g., with negligible diffraction) a circularly polarized light (or an elliptically polarized light) having a handedness that is opposite to the predetermined handedness.

In some embodiments, the PVH layer 210 may include LCs and chiral dopants doped into the LCs to induce a helical twist along a thickness direction of the PVH layer 210. The helix twist may be left-handed or right-handed, and the corresponding PVH layer 210 may be referred to as a left-handed or a right-handed PVH layer. In some embodiments, the PVH layer 210 may diffract circularly polarized lights having a same handedness as the helix twist of the PVH layer 210, and transmit circularly polarized lights having a handedness opposite to the handedness of the helix twist with negligible diffraction. That is, a left-handed PVH layer may diffract a left-handed circularly polarized ("LHCP") light and transmit a right-handed circularly polarized ("RHCP") light with negligible diffraction. A right-handed PVH layer may diffract an RHCP light and transmit an LHCP light with negligible diffraction. An unpolarized light can be decomposed into an RHCP portion and an LHCP portion. Thus, a right-handed PVH layer may diffract an RHCP portion of the unpolarized light, and transmit an LHCP portion of the unpolarized light with negligible diffraction. A left-handed PVH layer may diffract an LHCP portion of the unpolarized light, and transmit an RHCP portion of the unpolarized light with negligible diffraction.

The angle between the incident light and the diffracted light may depend on the wavelength of the incident light and a Bragg period of the Bragg grating in the PVH layer 210. In some embodiments, depending on the alignment of the LC molecules in the PVH layer, the PVH layer may further converge or diverge the incident light. The PVH layer 210 may also be referred to as, e.g., a "polarization selective grating," a "polarization selective optical element," a "liquid crystal grating," or a "chiral liquid crystal element." Although the diffractive optical element 220 is shown as including flat surfaces, it is understood that in some embodiments, the diffractive optical element 220 may have a curved surface. For example, the substrates 205 and 215 and/or the PVH layer 210 may each have a curved surface. Exemplary structures of a PVH grating will be described below in connection with FIGS. 15A and 15B.

For simplicity, the light source 105 and the eye 115 shown in FIG. 1 (which may both be located on the same side as the optical sensor 110 in FIG. 2) are not shown in FIG. 2. In some embodiments, at least one wavelength in the spectrum of the light source 105 may correspond to a Bragg period of the Bragg grating formed by the LC molecules in the PVH layer 210. In some embodiments, the light emitted by the light source 105 may have a wavelength in the IR spectrum and corresponding to the Bragg period of the Bragg grating in the PVH layer 210. The wavelength of the light may be, e.g., from about 800 nm to about 1600 nm, such as about 850 nm, about 930 nm, or about 940 nm. The Bragg period of the Bragg grating in the PVH layer 210 may be, e.g., from about 200 nm to about 350 nm, or centered at about 288 nm or about 320 nm.

The lights from the light source 105 may illuminate the eye 115, and be reflected by the eye 115 (shown in FIG. 1). The lights reflected by the eye 115 may be referred to as eye-reflected lights (or more generally, object-reflected lights). The eye-reflected lights may be incident onto the diffractive optical element 220 at different incidence angles. The PVH layer 210 may be configured to diffract an eye-reflected light incident onto the PVH layer 210 via Bragg diffraction when an incidence angle is within a first predetermined range, i.e., when a Bragg condition is satisfied. The PVH layer 210 may transmit an eye-reflected light having an incidence angle outside of the first predetermined range, i.e., when the Bragg condition is not satisfied. In some embodiments, the first predetermined range may be approximately from 0° to 60° in air, including 0° and 60°. In some embodiments, the substrate 215 may be a glass having a refractive index of 1.5, and the first predetermined range may be approximately from 0° to 35° in the glass, including 0° and 35°. For illustrative purposes, FIG. 2 shows a "Primary signal path" in which an unpolarized light 225, which is an eye-reflected light, is substantially normally incident onto the diffractive optical element 220 (i.e., at a substantially 0° incidence angle). Because the primary signal light 225 is substantially perpendicularly incident onto the surfaces of the substrates 205 and 215, the surface reflection (Fresnel reflectance) at the substrates 205 and 215 of the diffractive optical element 220 may be substantially zero.

On the other hand, an eye-reflected light incident onto the PVH layer 210 at an incidence angle outside of the first predetermined range may not be diffracted by the PVH layer 210. The eye-reflected light incident onto the PVH layer 210 at an incidence angle outside of the first predetermined range may be reflected by the surfaces of the substrates 205 and 215 as a surface reflection light. The diffractive optical element 220 may direct the surface reflection light toward the optical sensor 110. Not all surface reflection lights directed by the diffractive optical element 220 toward the optical sensor 110 may be received by the optical sensor 110 due to the configuration of the optical sensor 110 (e.g., a specific light receiving area and/or a light receiving direction). In some embodiments, only the surface reflection light that is incident onto the diffractive optical element 120 at an incidence angle within a second predetermined range may be received by the optical sensor 110. A surface reflection light that is incident onto the diffractive optical element 220 at an incidence angle outside of the second predetermined range may not be received by the optical sensor 110. For illustrative purposes, FIG. 2 shows two surface reflection light paths, "Secondary signal path 1" and "Secondary signal path 2." In the secondary signal paths, unpolarized lights 221 and 222 that are reflected by the eye (or more generally, a tracked object) may be incident onto the diffractive optical element 220 at an incidence angle within the second predetermined range. The unpolarized lights 221 and 222 may be respectively reflected at a surface of the first substrate 205 and a surface of the second substrate 215 toward the optical sensor 110, and may be received by the optical sensor 110.

When the first substrate 205 and the second substrate 215 are glass having refractive index of 1.5, the inventors found that the second predetermined range is about 45° to 75° in air. That is, a surface reflection light corresponding to a light incident onto the diffractive optical element 220 at an incidence angle within a range of 45° to 75° in air may be received by the optical sensor 110, whereas a surface reflection light corresponding to a light incident onto the diffractive optical element 210 at an incidence angle outside of the range of 45° to 75° in air may not be received by the optical sensor 110. The inventors also found that when a light is incident onto the diffractive optical element 220 at an incidence angle within the second predetermined range of about 45° to about 75° in air, the corresponding surface reflection light may be substantially s-polarized.

Figure 3:
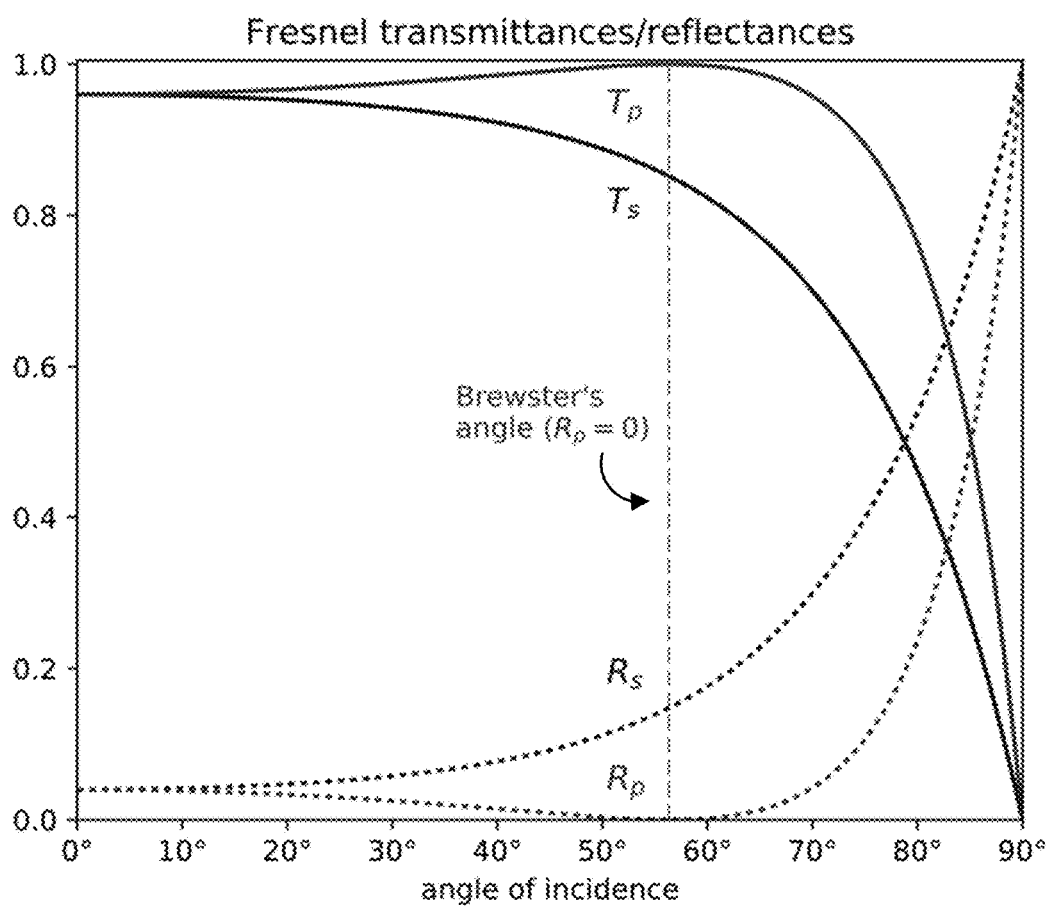
FIG. 3 shows a plot of Fresnel transmittance and reflectance versus incidence angle at an air-glass interface.

FIG. 3 shows a plot of Fresnel transmittance (Ts and Tp) and reflectance (Rs and Rp) versus the incidence angle at an air-glass interface. Ts and Tp represent the Fresnel transmittance for an s-polarized light and a p-polarized light, respectively. Rs and Rp represent the Fresnel reflectance for the s-polarized light and the p-polarized light, respectively. As shown in FIG. 3, due to the position, direction, and receiving area of the optical sensor 110, the surface reflection light that can be received by the optical sensor 110 can be the surface reflection light of an incident light having an incidence angle in a range of 45° to 75° in air. In addition, within such an incidence angle range, the surface reflection light is primarily s-polarized. As indicated by the curves for Rs and Rp, within such an incidence angle range, the reflectance for a p-polarized light Rp is substantially zero, whereas the reflectance for an s-polarized light is about 0.1 to about 0.4.

Referring back to FIG. 2, an effect of surface reflection in the diffractive optical element 220 is explained as follows. In the Secondary signal path 1, the unpolarized light 221 may be incident onto the second substrate 215 at an incidence angle in a range of about 45° to about 75° in air. The light 221 may propagate through the second substrate 215 and the PVH layer 210 without being diffracted, and propagate into the first substrate 205. The light 221 may be reflected by the top surface of the first substrate 205 as an s-polarized light 230. The s-polarized light 230 may be incident onto the PVH layer 210. The PVH layer 210 may be a left-handed PVH layer that diffracts an LHCP light and transmit an RHCP light with negligible diffraction. Thus, an LHCP portion of the s-polarized light 230 may be diffracted by the PVH layer 210 as an LHCP light 231 propagating toward the first substrate 205, and an RHCP portion of the s-polarized light may be transmitted through the PVH layer 210 with negligible diffraction as an RHCP light 233 propagating toward the second substrate 215. The RHCP light 233 may be refracted at the bottom surface of the second substrate 215 (the surface facing the eye 115 or the optical sensor 110) to become an RHCP light 245, which is received by the optical sensor 110. In the Secondary signal path 2, the unpolarized light 222 may be incident onto the second substrate 215 at an incidence angle in a range of 45° to 75° in air. The unpolarized light 222 may be reflected at the bottom surface of the second substrate 215 as an s-polarized light 255, which may be received by the optical sensor 110.

In the Primary signal path, the unpolarized signal light 225 may be substantially normally incident onto the second substrate 215, and the LHCP portion of the unpolarized signal light 225 may be diffracted by the PVH layer 210 as an LHCP light 240. For simplicity of illustration and discussion, the RHCP portion of the unpolarized signal light 225 that transmits through the PVH layer 210 toward the first substrate 205 is omitted in FIG. 2. The LHCP light 240 may be refracted at the bottom surface of the second substrate 215 as an LHCP light 250. The RHCP light 245 from the Secondary signal path 1, the s-polarized light 255 from the Secondary signal path 2, and the LHCP light 250 from the Primary signal path may all be received by the optical sensor 110, based on which an image of the eye 115 may be generated. The s-polarized light 255 and the RHCP light 245 may be surface reflection lights. When eye-tracking signals generated based on the surface reflection lights and the LHCP light 250 are not separated from each other, a brighter primary image of the eye superimposed with a darker secondary image of the eye may be generated, rendering it difficult to extract eye-tracking information, thereby degrading the eye-tracking accuracy. In some embodiments, the eye-tracking signal may be a signal light. In some embodiments, the eye-tracking signal may be image information generated based on the signal light.

Figure 4:
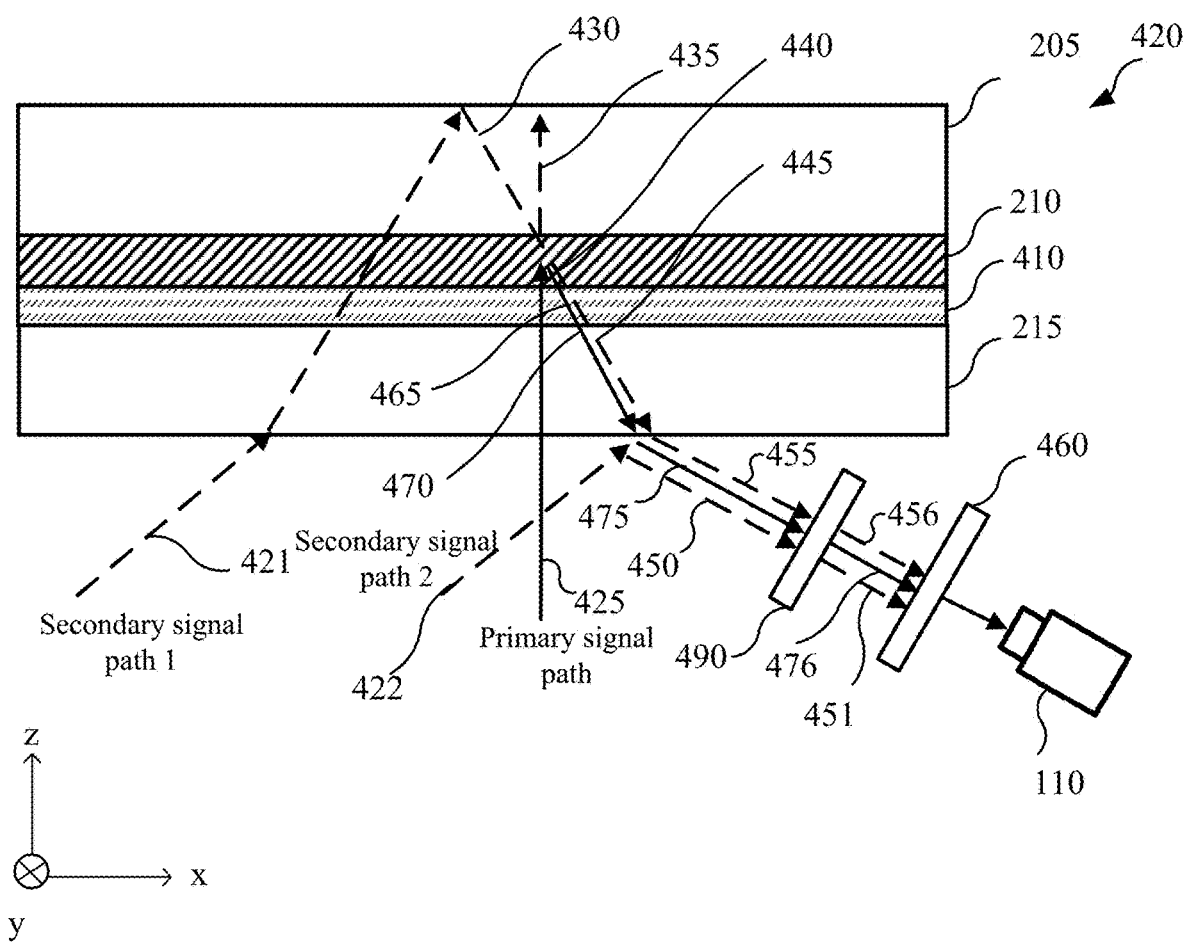
FIG. 4 illustrates a schematic diagram of an eye-tracking system, according to an embodiment of the present disclosure.

FIG. 4 illustrates a schematic diagram of an eye-tracking system 400 having a polarization selective mechanism that enables a time-multiplexing multi-view eye-tracking, according to an embodiment of the present disclosure. The eye-tracking system 400 includes elements similar to those included in the eye-tracking systems 100 and 200 respectively shown in FIG. 1 and FIG. 2. For example, the eye-tracking system 400 may include an diffractive optical element 420 and the optical sensor 110. The diffractive optical element 420 may include at least one substrate, such as substrates 205 and 215. The diffractive optical element 420 may include the grating structure 210 (or the PVH layer 210). Descriptions of the similar or the same elements can refer to the above descriptions rendered in connection with FIG. 1 and FIG. 2. As shown in FIG. 4, compared to the eye-tracking system 200 shown in FIG. 2, the eye-tracking system 400 may further include a waveplate 410 coupled to the PVH layer 210. The eye-tracking system 400 may further include a polarization converter 490 and a polarizer 460 arranged in front of the optical sensor 110 in an optical series. The polarization selective mechanism may include any combination of the polarization converter 490, the polarizer 460, and/or the optical sensor 110. In some embodiments, the substrates 205 and 215 may include a visible anti-reflection film to gain more signals in the IR Fresnel reflection.

The PVH layer 210 of the diffractive optical element 420 may have a first side facing the eye 115 (or the optical sensor 110) and a second side opposite to the first side. The waveplate 410 may be disposed at the first side of the PVH layer 210. For illustrative purposes, FIG. 4 shows that the waveplate 410 is disposed between the PVH layer 210 and the second substrate 215. That is, the second substrate 215 has a first side facing the eye 115 (or the optical sensor 110) and a second side opposite to the first side. The waveplate 410 may be disposed at the second side of the second substrate 215. In some embodiments, the waveplate 410 may be disposed at the first side of the second substrate 215 facing the optical sensor 110.

In some embodiments, the waveplate 410 may be a quarter-wave plate ("QWP") 410 for the IR spectrum. The QWP 410 may be configured to convert a circularly polarized light to a linearly polarized light and vice versa over an IR spectrum. In some embodiments, for an achromatic design, the QWP 410 may include a plurality of layers of one or more birefringent materials (e.g., polymer or LC materials) to produce quarter wave birefringence across a wide IR spectra range. In some embodiments, for a monochrome design, an angle between a polarization axis (i.e., fast axis) of the QWP 410 and a polarization direction of the incident linearly polarized light may be about 45 degrees. As a person having ordinary skills in the art can appreciate, the QWP 410 for the IR spectrum may be a half-wave plate for the visible spectrum. For example, the QWP 410 designed for 900 nm wavelength in the IR range may be a substantial half-wave plate for the 450 nm wavelength in the visible range.

The polarization converter 490 may be an active polarization converter configured to convert the polarization of an incident light from a first polarization to a second polarization different from (e.g., orthogonal to) the first polarization, or maintain the polarization of the incident light in accordance with a switching state (e.g., active or non-active) of the polarization converter 490. Two polarizations are orthogonal to each other when an inner product of two vectors representing the two polarizations is substantially zero. Any suitable polarization converter may be used. In some embodiments, the polarization converter may include a switchable half-wave plate ("SHWP") having a polarization axis oriented relative to the polarization direction of the incident light to convert the incident polarized light from the first polarization to the second polarization, or maintain the polarization in accordance with a switching state (e.g., active or non-active) of the polarization converter 490. The second polarization may be orthogonal to the first polarization. In some embodiments, the SHWP may include a liquid crystal ("LC") layer, where an electrical field (e.g., a voltage) may be applied to change the orientation of the LC molecules, thereby switching the polarization converter 490 between an active state and a non-active state.

The polarizer 460 may be disposed between the polarization converter 490 and the optical sensor 110 in an optical series. The polarizer 460 may be configured to transmit a light having a polarization along the transmission axis of the polarizer. In some embodiments, the polarizer 460 may be an absorptive type polarizer configured to selectively block an incident light having the first polarization via absorption, and selectively transmit an incident having the second polarization. In some embodiments, the polarizer 460 may be an absorptive type polarizer configured to selectively block an incident light having the second polarization via absorption, and selectively transmit an incident light having the first polarization. For illustrative purposes, FIG. 4 shows that the polarizer 460 may be configured to transmit a p-polarized light and block an s-polarized light.

As shown in FIG. 4, in the Secondary signal path 1, an unpolarized light 421 may be incident onto the second substrate 215 at an incidence angle in a range of about 45° to about 75° in air. After being transmitted through the second substrate 215, the QWP 410, the PVH layer 210 (without being diffracted by the PVH layer 210), and the first substrate 205, the unpolarized light 421 may be reflected at a top surface of the first substrate 205 to become an s-polarized light 430, which propagates toward the PVH layer 210. The PVH layer 210 may diffract an LHCP portion of the s-polarized light 430 as an LHCP light 435 propagating toward the first substrate 205, and transmit an RHCP portion of the s-polarized light 430 as an RHCP light 440 propagating toward the QWP 410. The QWP 410 may convert the RHCP light 440 to an s-polarized light 445, which may be refracted at the bottom surface of the second substrate 215 to become an s-polarized light 455. When the polarization converter 490 is in an active state, the polarization converter 490 may convert the s-polarized light 455 into a p-polarized light 456.

The p-polarized light 456 may be incident onto the polarizer 460. Because the polarizer 460 may be configured to transmit a p-polarized light and block an s-polarized light, the p-polarized light 456 may be transmitted through the polarizer 460 and may be incident onto the optical sensor 110. When the polarization converter 490 is in a non-active state, the polarization of the incident light may remain unchanged after transmitting through the polarization converter 490. Thus, the s-polarized light 455, which remains an s-polarized light after transmitting through the polarization converter 490, may be blocked by the polarizer 460, and may not be received by the optical sensor 110.

In the Secondary signal path 2, an unpolarized light 422 may be incident onto the second substrate 215 at an incidence angle of about 45° to about 75° in air. The unpolarized light 422 may be reflected by the bottom surface of the second substrate 215 to become an s-polarized light 450. When the polarization converter 490 is in the non-active state, the s-polarized light 450 may remain an s-polarized light after transmitting through the polarization converter 490, which may be blocked by the polarizer 460 and may not be received by the optical sensor 110. When the polarization converter 490 is in the active state, the s-polarized light 450 may become a p-polarized light 451, which may be transmitted through the polarizer 460 and received by the optical sensor 110.

In the Primary signal path, an unpolarized signal light 425 may be substantially normally incident onto the diffractive optical element 420 (i.e., the incidence angle is about 0 degree, or within a small range around 0 degree, such as −5 degrees to 5 degrees). The primary signal light 425 may propagate through the second substrate 215 and the QWP 410, and substantially normally incident onto the PVH layer 210. An LHCP portion of the primary signal light 425 may be diffracted by the PVH layer 210 as an LHCP light 465 propagating towards the QWP 410. An RHCP portion of the primary signal light 425 may be transmitted through the PVH layer 210, and may propagate toward the first substrate 205, which is not shown in FIG. 4 for simplicity. The QWP 410 may convert the LHCP light 465 to a p-polarized light 470. The p-polarized light 470 may be refracted at the bottom surface of the second substrate 215 to become a p-polarized light 475. When the polarization converter 490 is in the non-active state, the p-polarized light 475 may remain a p-polarized light after transmitting through the polarization converter 490, which may be transmitted through the polarizer 460 and received by the optical sensor 110. When the polarization converter 490 is in the active state, the p-polarized light 475 may be converted to an s-polarized light, which may be blocked by the polarizer 460 and may not be received by the optical sensor 110.

Thus, when the polarization converter 490 is in the non-active state, the optical sensor 110 may receive only the p-polarized light 475 coming from the Primary signal path, and may not receive the s-polarized light 455 and the s-polarized light 450 coming from the Secondary signal path 1 and Secondary signal path 2, respectively. When the polarization converter 490 is in the active state, the optical sensor 110 may receive only the p-polarized light respectively converted from the s-polarized light 455 and the s-polarized light 450 coming from the Secondary signal path 1 and Secondary signal path 2, and may not receive the light coming from the Primary signal path. That is, through switching the polarization converter 490 between the active state and the non-active state, at a first time instance or time period, the optical sensor 110 may receive only the secondary signal lights from the Secondary signal path 1 and Secondary signal path 2, and at a second instance or time period, the optical sensor 110 may receive only the primary signal light from the Primary signal path. In other words, the polarization converter 490 and the polarizer 460 together may be configured to alternately transmit the primary signal light and the secondary signal light toward the optical sensor 110 in a time-multiplexing manner. The optical sensor 110 may generate different images of the eyes respectively based on the primary signal light and the secondary signal light separately received in the time-multiplexing manner, enabling a time-multiplexing multi-view eye-tracking. Compared to single view eye-tracking, more information relating to the eye may be extracted from the primary signal light and secondary signal light received by the optical sensor 110, thereby improving the accuracy of eye-tracking.

Figure 5:
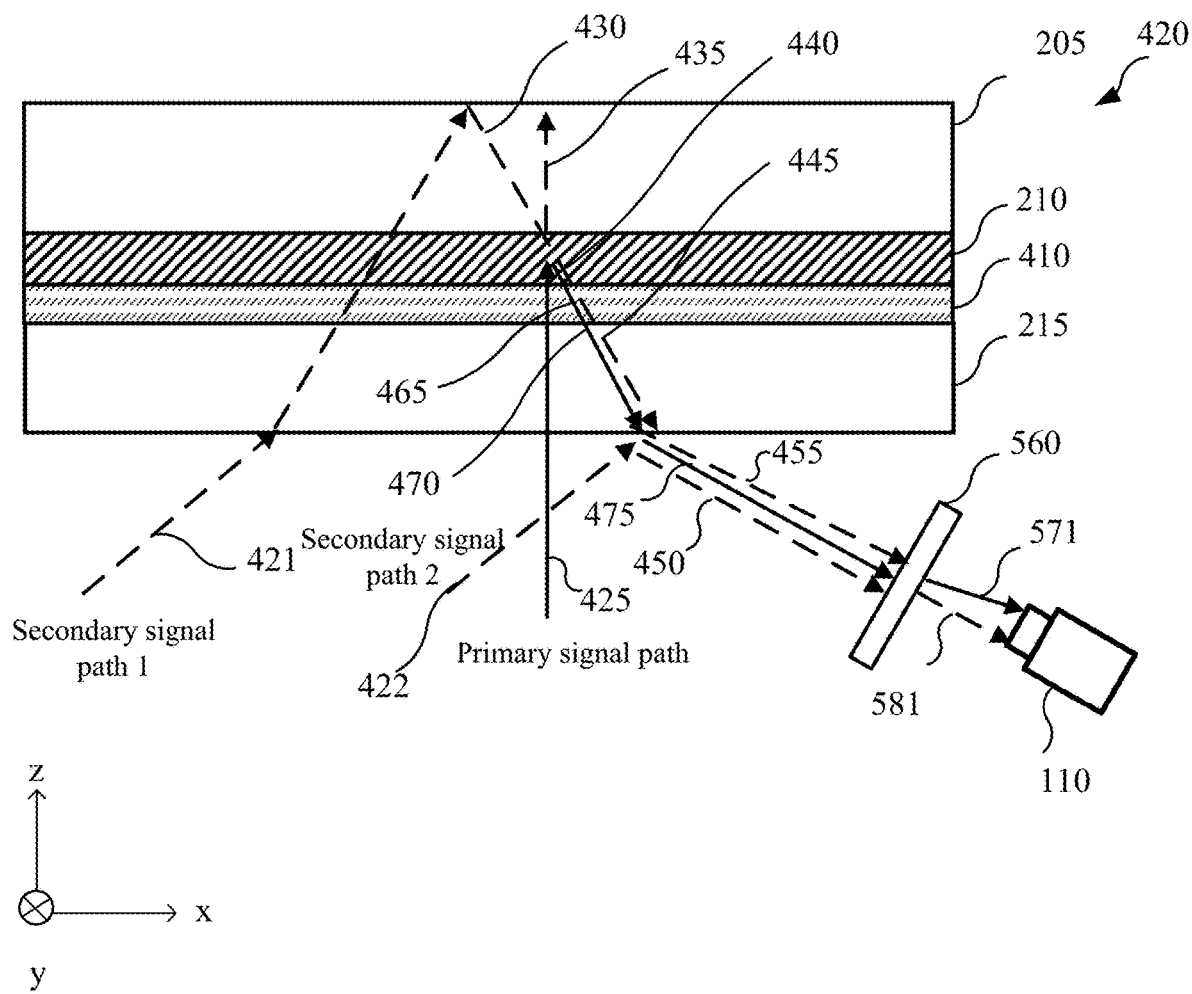
FIG. 5 illustrates a schematic diagram of an eye-tracking system, according to another embodiment of the present disclosure.

FIG. 5 illustrates a schematic diagram of an eye-tracking system 500 with a polarization selective mechanism that enables a spatial-multiplexing multi-view eye-tracking, according to an embodiment of the present disclosure. The eye-tracking system 500 includes elements similar to those included in the eye-tracking systems 100, 200, and 400 shown in FIG. 1, FIG. 2, and FIG. 4. The descriptions of the similar or the same elements are omitted. For example, the eye-tracking system 500 may include the diffractive optical element 420, as in the eye-tracking system 400. The eye-tracking system 500 may include a polarization selective mechanism, which may include a polarization selective steering assembly 560 and the optical sensor 110 arranged in an optical series. Compared to the eye-tracking system 400 shown in FIG. 4, in the eye-tracking system 500 of FIG. 5, the polarization selective steering assembly 560 may replace the polarization converter 490 and the polarizer 460 in FIG. 4 to enable a spatial-multiplexing multi-view eye-tracking.

The polarization selective steering assembly 560 may be configured to steer the incident lights of different polarizations in different angles (or directions) toward different detecting regions of the optical sensor 110. The distance between the different detecting regions may be sufficiently large to be recognized by the optical sensor 110. For example, the distance between the different regions may be larger than or equal to the smallest distance that could be recognized by the optical sensor 110. In some embodiments, the optical sensor 110 may generate separate images (e.g., different perspective views) based on the lights received at different detecting regions. In some embodiments, the optical sensor 110 may generate a single image based on the lights received at different detecting regions. The single image may be processed to extract different perspective views of the eye. Thus, different perspective views of the eye may be provided by the optical sensor 110. Accordingly, the tracking accuracy may be enhanced.

For example, as shown in FIG. 5, after propagating through from the diffractive optical element 420, the s-polarized light 455 in the Secondary signal path 1, the s-polarized light 450 in the Secondary signal path 2, and the p-polarized light 475 in the Primary signal path may be incident onto the polarization selective steering assembly 560. The polarization selective steering assembly 560 may steer the p-polarized light 475 and the s-polarized lights 450 and 455 in different angles (or directions) to become a light 571 having a first steering angle and a light 581 having a second steering angle, respectively. In some embodiments, the steering angle difference between the light 571 and the light 581 and/or the distance between the optical sensor 110 and the polarization selective steering assembly 560 may be configured such that the light 571 and the light 581 may be received by different detecting regions of the optical sensor 110. Increasing the distance between the optical sensor 110 and the polarization selective steering assembly 560 may result a large form factor of the system. The optical sensor 110 may provide multiple perspective views of the eye based on the received light 571 and 581, thereby enhancing the eye-tracking accuracy.

Figure 6:
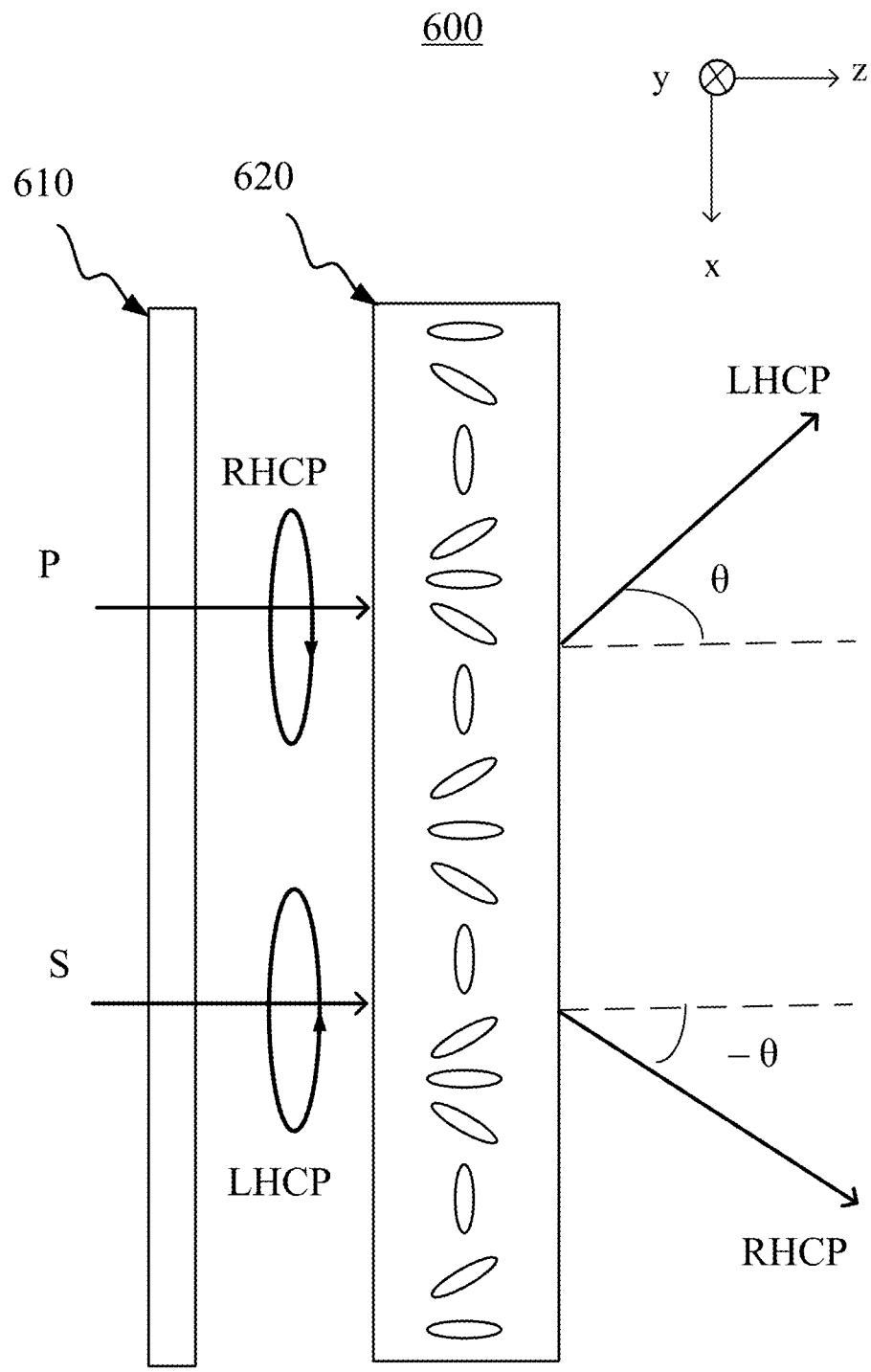
FIG. 6 illustrates a schematic diagram of a Pancharatnam-Berry Phase ("PBP") steering assembly, according to another embodiment of the present disclosure.

In some embodiments, the polarization selective steering assembly 560 may include at least one liquid crystal ("LC") steering element configured to steer the incident lights of different polarizations in different angles (or directions), such as an optical phased array ("OSA"), a switchable Bragg grating, an index matched surface relief grating, or a Pancharatnam-Berry Phase ("PBP") grating. In some embodiments, the polarization selective steering assembly may include two LC steering elements configured to steer modulated light beams over two axes. In some embodiments, the polarization selective steering assembly may include a metasurface steering element. For discussion purposes, a PBP grating will be used as an example of the LC steering element in the following description, and the polarization selective steering assembly 560 may be referred to as a PBP steering assembly. FIG. 6 illustrates a schematic diagram of a PBP steering assembly 600 configured to steer an incident light of different polarizations to different angles (or directions). The PBP steering assembly 600 may be an embodiment of the polarization selective steering assembly 560 shown in FIG. 5. As shown in FIG. 6, the PBP steering assembly 600 may include a quarter-wave plate ("QWP") 610 and a PBP grating 620 arranged in an optical series. A polarization axis of the QWP 610 may be orientated relative to a polarization direction of an incident light to convert a linearly polarized light to a circularly polarized light and vice versa over an IR spectrum. The PBP grating 620 may diffract a circularly polarized light by an angle θ according to the handedness of circularly polarized incident light, which is expressed by the following Equation (1)

$$\theta = \sin^{-1}\left(\frac{\lambda}{\Lambda}\right),\qquad(1)$$

where λ is the wavelength of the incident light, and Λ is the pitch of the PBP grating 620.

Figure 7A:
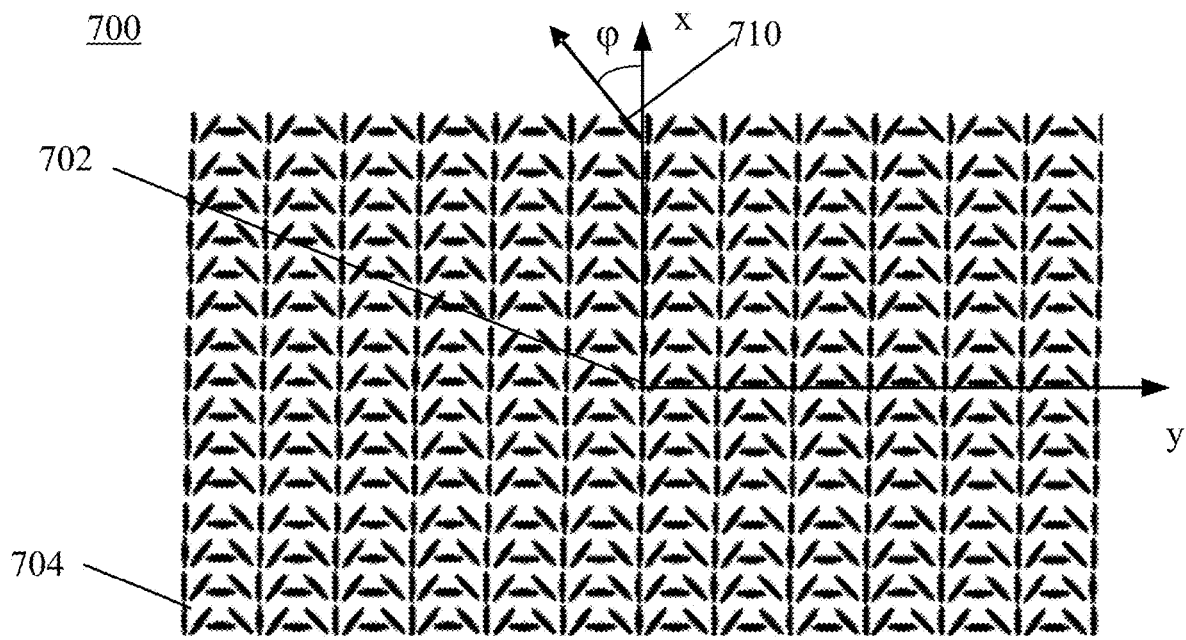
FIG. 7A illustrates liquid crystal ("LC") orientations in a PBP grating shown in FIG. 6, according to an embodiment of the present disclosure.
Figure 7B:
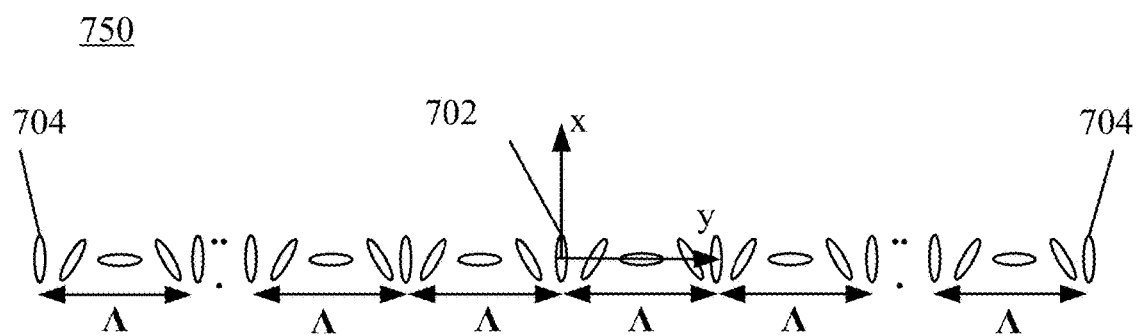
FIG. 7B illustrates a section of LC orientations taken along a y-axis in the PBP grating shown in FIG. 7A, according to an embodiment of the present disclosure.

FIG. 7A illustrates LC orientations 700 in the PBP grating 620 shown in FIG. 6, and FIG. 7B illustrates a section of LC orientations 750 taken along a y-axis in the PBP grating 620 shown in FIG. 6. As shown in FIGS. 7A and 7B, the azimuth angles (φ) of LC molecules 710 may change in a linearly repetitive pattern from a center 702 to an edge 704 of the PBP grating 620, with a uniform pitch Λ. The pitch Λ of the PBP grating 620 may be defined as a distance in which the azimuthal angle changes by 180°. The pitch Λ may be half the distance along the y-axis between repeated portions of the pattern (i.e., the distance in which the azimuthal angle changes by 360°). The pitch Λ may determine, in part, the optical properties of the PBP grating 620. For example, the pitch Λ may determine the diffraction angles (e.g., beam steering angles) of the light as shown in Eq. (1). Generally, the smaller the pitch Λ, the larger the diffraction angle for a given wavelength of light.

Returning to FIG. 6, in some embodiments, the PBP grating 620 may be passive (also referred to as a passive element). A passive PBP grating may not be directly switchable by an external field (e.g., an electric field), but may be indirectly switchable between two optical states (or operation states): a positive state and a negative state, by changing a polarization of an incident light through a polarization switch. In some embodiments, in the positive state, the passive PBP grating may diffract a light having a specific wavelength to a positive angle (e.g., +θ), i.e., an angle that is defined to be positive when diffracted in a first direction relative to a reference normal of the PBP grating (e.g., when the first direction is counter-clockwise from the reference normal). In the negative state, the passive PBP grating may diffract a light having a specific wavelength to a negative angle (e.g., -θ), i.e., an angle that is defined to be negative when diffracted in a second direction relative to the reference normal of the PBP grating (e.g., when the second direction is clockwise from the reference normal). The optical state of a passive PBP grating may be determined by the handedness of the circularly polarized light incident on the passive PBP grating and the handedness of the PBP grating. In some embodiments, referring to FIG. 6, when a passive PBP grating is a right-handed PBP grating, the PBP grating 620 may operate in a positive state in response to a right-handed circularly polarized (RHCP) light, and operate in a negative state in response to a left-handed circularly polarized (LHCP) light. A polarization switch may be used to control the polarization of the incident light of the PBP grating 620, thereby indirectly switching the optical state of the PBP grating 620.

In some embodiments, the PBP grating 620 may be active (also referred to as an active element). An active PBP grating may have three optical states: a positive state, a neutral state, and a negative state. In some embodiments, in the positive state and the negative state, the active PBP grating may diffract lights having specific wavelengths to a positive angle (e.g., +θ) and a negative angle (e.g., -θ), respectively.

When not in the neutral state, the active PBP grating may output a light having a handedness opposite to that of the light input into the active PBP grating. In the neutral state, the active PBP grating may not diffract lights, and may or may not affect the polarization of the lights transmitted through the active PBP grating. The optical state of an active PBP grating may be determined by a handedness of the circularly polarized light incident onto the active PBP grating and an applied electric field (e.g., a voltage). In some embodiments, an active PBP grating may operate in a positive state in response to an RHCP light and an applied voltage lower than a first predetermined voltage (e.g., zero volt), operate in a negative state in response to an LHCP light and an applied voltage lower than a first predetermined voltage (e.g., zero volt), and operate in a neutral state (polarization independent state) in response to an applied voltage higher than a second predetermined voltage that causes the LCs to be aligned along with the electric field. Further, through flipping the PBP grating, the positive state and the negative state of the PBP grating may be reversed for the circularly polarized incident light with the same handedness. A right-handed PBP grating may become a left-handed PBP grating and vice versa.

For illustrative purposes, FIG. 6 shows that the QWP 610 may convert a p-polarized incident light and an s-polarized incident light to a right-handed circularly polarized (RHCP) light and a left-handed circularly polarized (LHCP) light, respectively. The PBP grating 620 may diffract the RHCP light and LHCP light to a positive angle (e.g., +θ) and a negative angle (e.g., -θ), respectively. Further, the PBP grating 620 may reverse the handedness of the diffracted light. For example, an RHCP (or LHCP) input light may be converted to an LHCP (or RHCP) output light after propagating through the PBP grating 620. Thus, linearly polarized incident lights with different polarizations may be spatially separated from each other.

Referring to FIG. 5 and FIG. 6, the PBP steering assembly 600 may be an embodiment of the polarization selective steering assembly 560 shown in FIG. 5. The QWP 610 in the PBP steering assembly 600 may convert a linearly polarized incident light into a circularly polarized light. The circularly polarized light may be incident onto the PBP grating 620. The QWP 610 may convert the s-polarized lights 450 and 455 in the secondary signal paths into an LHCP light, and the p-polarized light 475 in the primary signal path into an RHCP light. The PBP grating 620 may diffract the incident RHCP light and LHCP light as the LHCP light 571 with a first diffraction angle and an RHCP light 581 with a second diffraction angle, respectively. The LHCP light 571 and RHCP light 581 may be directed to different detecting regions of the optical sensor 110. Different perspective views of the eye may be generated based on the LHCP light 571 and RHCP light 581. In other words, different perspective views of the eye may be generated based on the primary signal light and the secondary signal light, respectively, thereby enabling a spatial-multiplexing multi-view eye-tracking. Additional information relating to the eyes may be obtained, thereby improving the accuracy of eye-tracking.

Figure 8:
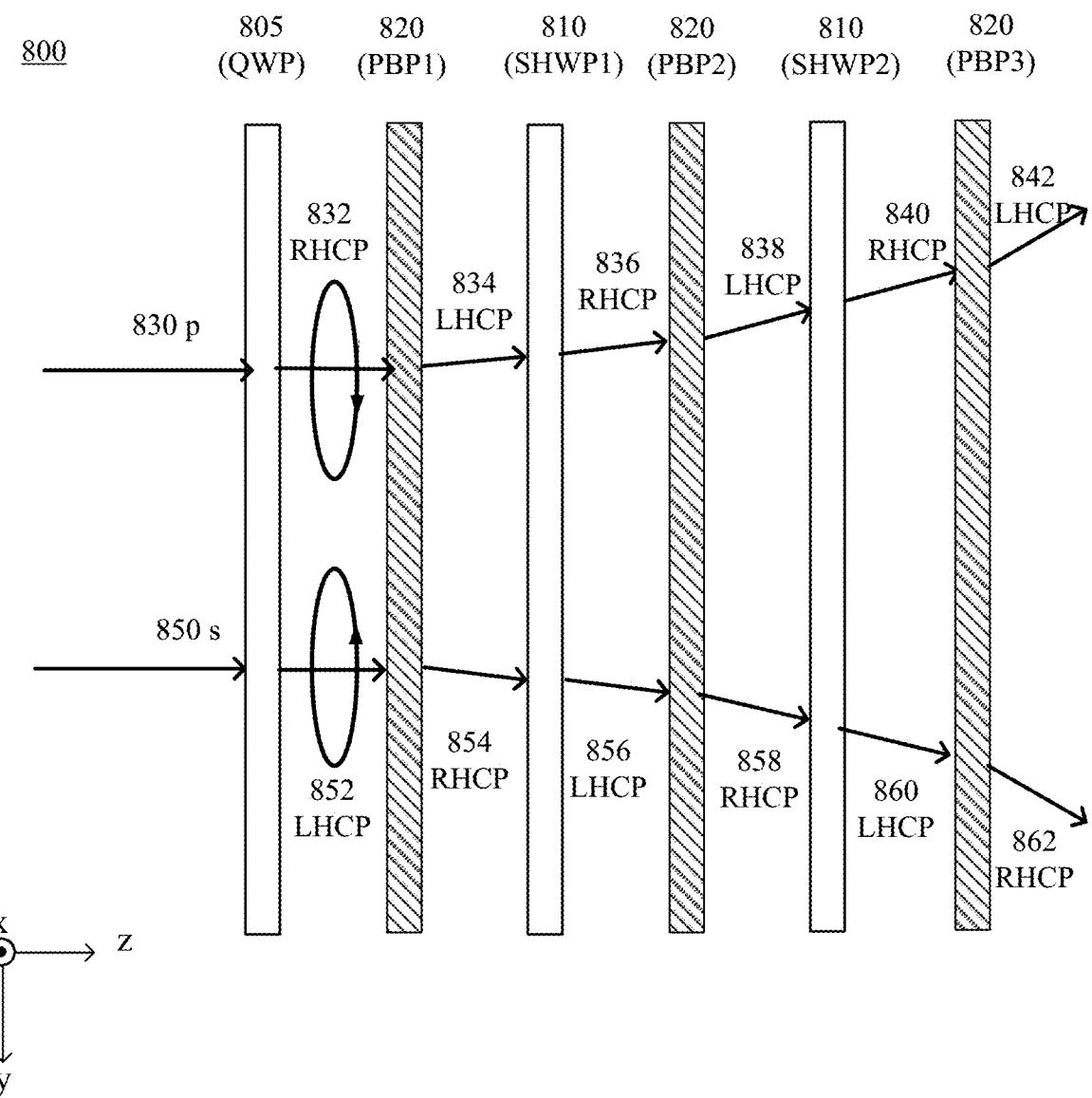
FIG. 8 illustrates a schematic diagram of a PBP steering assembly, according to another embodiment of the present disclosure.

To increase the steering angle, the PBP steering assembly may include a plurality of PBP gratings, where the steering angle provided by the PBP gratings may be accumulated to widen the range of the steering angle (or direction). FIG. 8 illustrates a schematic diagram of a PBP steering assembly 800, according to another embodiment of the disclosure. The PBP steering assembly 800 may be an embodiment of the polarization selective steering assembly 560 shown in FIG. 5. As shown in FIG. 8, the PBP steering assembly 800 may include a QWP 805, a plurality of PBP gratings 820, and a plurality of switchable half-wave plates ("SHWP") 810. The PBP gratings 820 and the SHWPs 810 may be alternately arranged. For illustrative purposes, FIG. 8 shows that the PBP steering assembly 800 may include two SHWPs 810 (SHWP1 and SHWP2), and three PBP gratings 820 (PBP1, PBP2, and PBP3). The QWP 805 may be similar to the QWP 610 shown in FIG. 6. The SHWP 810 may be a half-wave plate configured to transmit a polarized light of a specific handedness in accordance with a switching state of the SHWP 810. The PBP grating 820 may diffract a circularly polarized light at an angle according to the handedness of the circularly polarized incident light.

The PBP steering assembly 800 may control the handedness of a circularly polarized light incident onto a PBP grating in accordance with an operation state of the SHWP 810. The operation state of the SHWP 810 may be a switching state or a non-switching state. Although not shown in FIG. 8, a controller and a power source (e.g., a voltage source) may be included to directly control the operation state of the SHWP 810 between the switching state and the non-switching state. In some embodiments, in the switching state, the SHWP 810 may reverse the handedness of a circularly polarized incident light, and in the non-switching state, the SHWP 810 may transmit the circularly polarized light without affecting the handedness. For example, when the incident light is an LHCP light, the SHWP in the switching state may output an RHCP light, and the SHWP in the non-switching state may output an LHCP light. Because the optical state of the PBP grating 820 is determined by the handedness of the circularly polarized incident light, the SHWP 810 disposed before the PBP grating 820 in an optical series may control whether the PBP grating 820 operates in an positive state or a negative state through controlling the handedness of the circularly polarized light incident onto the PBP grating 820.

FIG. 8 shows that the PBP steering assembly 800 steers incident lights of different polarizations to different angles (or directions). For illustrative purposes, FIG. 8 shows that the PBP gratings 820 (PBP 1 to PBP3) are all right-handed passive PBP gratings. Normally incident p-polarized light 830 and s-polarized light 850 may be converted to an RHCP light 832 and an LHCP light 852, respectively, by the QWP 805. The RHCP light 832 and the LHCP light 852 may be diffracted by the PBP1 as an LHCP light 834 at a first (e.g., positive) angle (e.g., +θ1) and an RHCP light 854 at a second (e.g., negative) angle (e.g., −θ1), respectively, which are received by the SHWP1. The SHWP1 may be in a switching state and, may convert the LHCP light 834 and RHCP light 854 into an RHCP light 836 and an LHCP light 586. The RHCP light 836 and the LHCP light 856 may be diffracted by the PBP2 as an LHCP light 838 at a first (e.g., positive) angle (e.g., +(θ1+θ2)) and an RHCP light 858 at a second (e.g., negative) angle (e.g., −(θ1+θ2)), respectively, which may be received by the SHWP2. The SHWP2 may be in a switching state and, may convert the LHCP light 838 and RHCP light 858 into an RHCP light 840 and an LHCP light 860. The RHCP light 840 and the LHCP light 860 may be diffracted by the PBP2 as an LHCP light 842 at a first (e.g., positive) angle (e.g., +(θ1+θ2+θ3)) and an RHCP light 862 at a second (e.g., negative) angle (e.g., —(θ1+θ2+θ3)), respectively.

Figure 9:
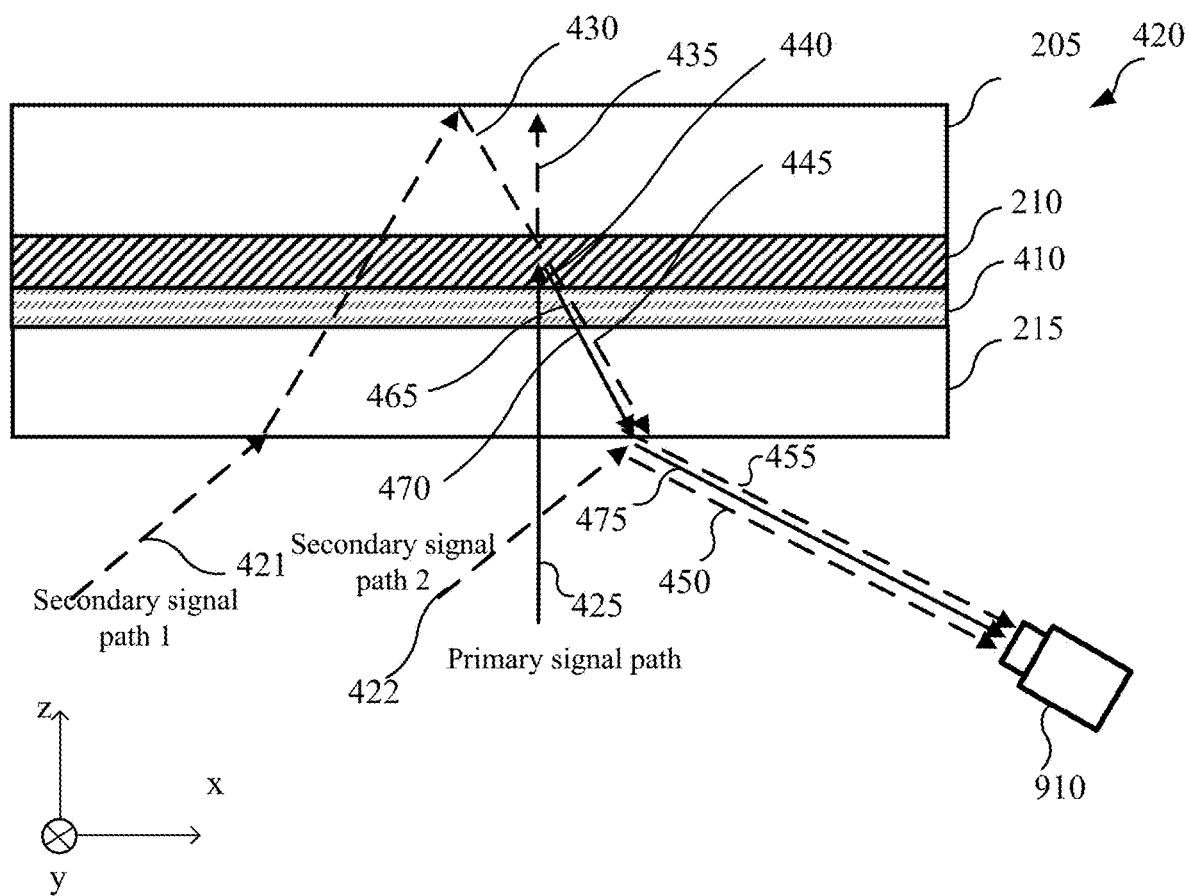
FIG. 9 illustrates a schematic diagram of an eye-tracking system, according to another embodiment of the present disclosure.

FIG. 9 illustrates a schematic diagram of an eye-tracking system 900 with a polarization selective mechanism that enables a spatial-multiplexing multi-view eye-tracking, according to an embodiment of the present disclosure. The eye-tracking system 900 includes elements similar to those included in the eye-tracking systems 100, 200, 400, and 500 shown in FIG. 1, FIG. 2, FIG. 4, and FIG. 5. The descriptions of the similar or the same elements are omitted. For example, the eye-tracking system 900 may include the diffractive optical element 420, as in the eye-tracking system 400.

Figure 10:
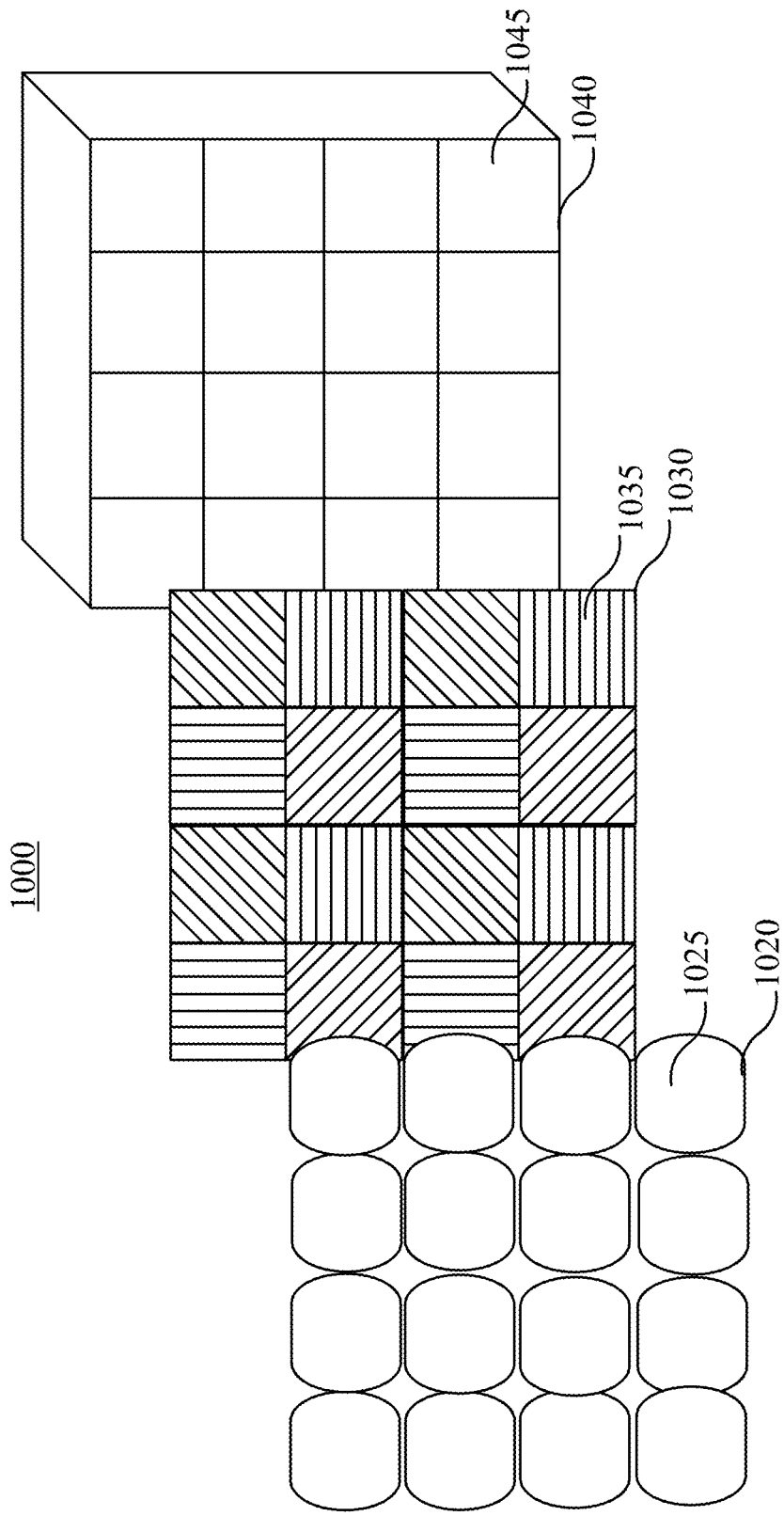
FIG. 10 illustrates an exploded view of a schematic structure of a pixelated polarized camera, according to an embodiment of the present disclosure.

As shown in FIG. 9, the eye-tracking system 900 may include a polarization selective mechanism that includes a pixelated polarized camera 910. The s-polarized lights 455 and 450 from the Secondary signal paths, and the p-polarized signal light 475 from the Primary signal path may be received by different detecting regions (e.g., pixels) of the pixelated polarized camera 910. FIG. 10 illustrates an exploded view of a schematic structure of a pixelated polarized camera 1000 for polarimetric imaging, according to an embodiment of the present disclosure. The pixelated polarized camera 1000 may be an embodiment of the pixelated polarized camera 910 shown in FIG. 9. As shown in FIG. 10, the pixelated polarized camera 1000 configured for an IR spectrum may include an on-chip micro-lens array 1020, a pixel-level micro-polarizer array 1030, and a photo diode array 1040 aligned and stacked together. The on-chip micro-lens array 1020 may include a plurality of lenses 1025 arranged in a matrix configuration. The micro-polarizer array 1030 may include a plurality of polarization selective structures 1035 (each functions as a micro-polarizer) arranged correspondingly to the plurality of lenses in the on-chip micro-lens array 1020. Each of the polarization selective structures 1035 may be configured with a certain polarization orientation, such that a light of a predetermined polarization may transmit through the polarization selective structure, whereas lights of other polarizations may be blocked. For example, FIG. 10 shows that the micro-polarizer array 1030 may include polarization selective structures 1035 with 0-degree, 45-degree, 90-degree, and 135-degree polarization orientations. In some embodiments, the micro-polarizer array 1030 may include pixelated wire-grid polarizers. The photo diode array 1040 may include a plurality of photo diodes 1045 arranged correspondingly to the plurality of polarization selective structures 1035 to receive the light transmitted through the corresponding polarization selective structures 1035. In some embodiments, the plurality of photo diodes 1045, the plurality of polarization selective structures 1035, and the plurality of lenses 1025 may be one-to-one corresponding to each other.

Through using the pixelated polarized camera 910, each photo diode 1045 may only receive a light of a predetermined polarization, such as a p-polarized light or an s-polarized light (or other polarizations depending on the configuration of the polarizer). Separate images may be generated based on the received lights of different polarizations. For example, referring to FIG. 9 and FIG. 10, a primary eye-tracking image may be generated based on a signal provided by the photo diodes receiving the p-polarized signal light 475 from the Primary signal path, and a secondary eye-tracking image may be generated based on a signal provided by the photo diodes receiving the s-polarized lights 455 and 450 from the Secondary signal paths. That is, the pixelated polarized camera 910 may be configured to receive the primary signal light and the secondary signal light by different photo diodes corresponding to the micro-polarizers having a first polarization orientation (e.g., p-polarization) and micro-polarizers having a second polarization orientation (e.g., s-polarization), respectively. Thus, different perspective views may be generated based on the primary signal light (e.g., p-polarized light) and secondary signal light (e.g., s-polarized light), thereby enabling a spatial-multiplexing multi-view eye-tracking and enhancing the eye-tracking accuracy.

In the embodiments shown in FIGS. 4-10, each of the eye-tracking systems 400, 500, and 900 includes a polarization selective grating, e.g., a PVH grating, configured to direct the light reflected by the eye 115 towards the optical sensor 110 or 910, which receives the primary signal light and the secondary signal light in a time-multiplexing manner and/or a spatial-multiplexing manner. In some embodiments, the eye-tracking system may include a non-polarization selective grating rather than a polarization selective grating. The primary signal light may be decomposed into a first portion and a second portion having a substantially equal intensity but different polarizations, for example, an s-polarized portion and a p-polarized portion, or an RHCP portion and an LHCP portion. The secondary signal light may have the same polarization as the second portion of the primary signal light, i.e., a different polarization from the first portion of the primary signal light. The optical sensor may be configured to receive the first portion of the primary signal light, and the secondary signal light and the second portion of the primary signal light in a time-multiplexing manner and/or a spatial-multiplexing manner, and generate different images. A first perceptive view of the eye may be obtained from a first image generated based on the first portion of the primary signal light. A second image generated based on the secondary signal light and the second portion of the primary signal light may be processed to obtain a second perceptive view of the eye. For example, the intensity of the corresponding pixels in the first image and the second image may be subtracted to obtain a third image, which primarily includes information of the secondary signal light, thereby providing a second perceptive view of the eye. Exemplary structures are shown in FIGS. 11-14.

Figure 11:
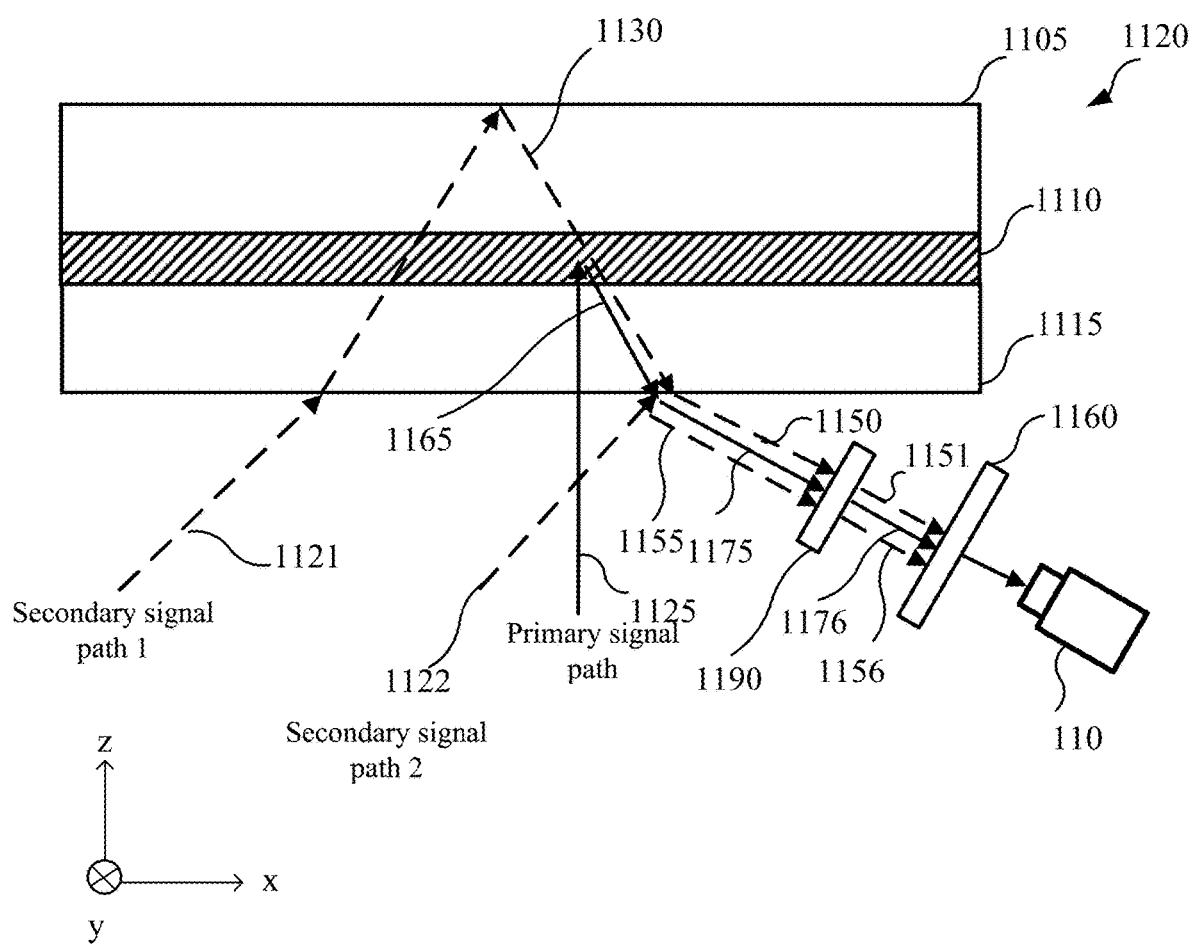
FIG. 11 illustrates a schematic diagram of an eye-tracking system, according to another embodiment of the present disclosure.

FIG. 11 illustrates a schematic diagram of an eye-tracking system 1100 with a polarization selective mechanism that enables a time-multiplexing multi-view eye-tracking, according to another embodiment of the present disclosure. As shown in FIG. 11, the eye-tracking system 1100 may include elements that are the same as or similar to those included in the eye-tracking system 400 shown in FIG. 4. Descriptions of the same or similar elements are omitted. For example, the eye-tracking system 1100 may include at least one substrate, such as two substrates 1105 and 1115, which may be similar to the substrates 205 and 215 shown in FIG. 4. The polarization selective mechanism of the eye-tracking system 1100 may include a polarization converter 1190 and a polarizer 1160, which may be similar to the polarization converter 490 and the polarizer 460, respectively. The eye-tracking system 1100 may further include the optical sensor 110 as described above.

The eye-tracking system 1100 may include a diffractive optical element 1120 that includes a holographic optical element ("HOE") 1110 disposed between the first substrate 1105 and the second substrate 1115. In some embodiments, one of the first substrate 1105 and the second substrate 1115 may be omitted. As compared to the eye-tracking system 400 of FIG. 4, the HOE 1110 may be a non-polarization selective element or a polarization insensitive element. In some embodiments, the HOE 1110 may be a volume Bragg grating ("VBG") element (hence the diffractive optical element 1120 may also be referred to as a VBG 1120).

The HOE 1110 may be configured such that only lights having incidence angles within a first predetermined range may be diffracted via Bragg diffraction, and lights having incidence angles outside of the first predetermined range may not be diffracted (e.g., may be transmitted through without diffraction or with negligible diffraction). In some embodiments, the first predetermined range of the incidence angle may be about 0° to about 60° in air, including 0° and 60°. In some embodiments, the substrates 1105 and 1115 may be glass having a refractive index of 1.5. The first predetermined range may be about 0° to about 35° in the glass, including 0° and 35°.

As shown in FIG. 11, in the Secondary signal path 1, an unpolarized light 1121 may be incident onto the second substrate 1115 at an incidence angle in a range of about 45° to 75° in air. The unpolarized light 1121 may propagate through the second substrate 1115 and the HOE 1110 (without being diffracted by the HOE 1110). The unpolarized light 1121 may be reflected at a top surface of the first substrate 1105 to become a reflected light 1130. As discussed above in connection with FIG. 3, the reflected light 1130 may be an s-polarized light. The s-polarized light 1130 may sequentially propagate through the first substrate 1105, the HOE 1110 (without being diffracted by the HOE 1110), and the second substrate 1115, and may become an s-polarized light 1150. In the Secondary signal path 2, an unpolarized light 1122 may be incident onto the second substrate 1115 at an incidence angle in a range of about 45° to 75° in air. The unpolarized light 1122 may be reflected at a bottom surface of the second substrate 1115 and become an s-polarized light 1155. In the Primary signal path, an unpolarized signal light 1125 may be substantially normally incident onto the diffractive optical element 1120. The primary signal light 1125 may prorogate through the second substrate 2115 and be diffracted by the HOE 1110 to become an unpolarized signal light 1165. The unpolarized signal light 1165 may propagate through the second substrate 1115 and become an unpolarized signal light 1175.

Figure 12A:
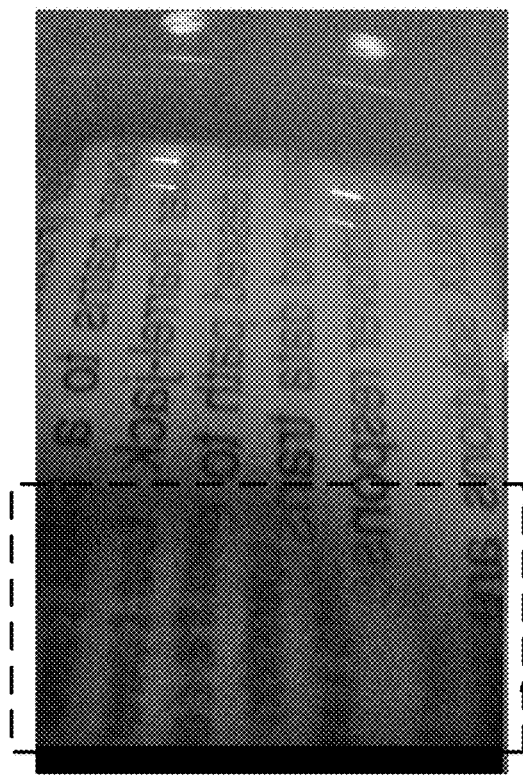
FIG. 12A illustrates a first image of a tracked object generated based on a combination of a primary signal light and a secondary signal light, according to an embodiment of the present disclosure.
Figure 12B:
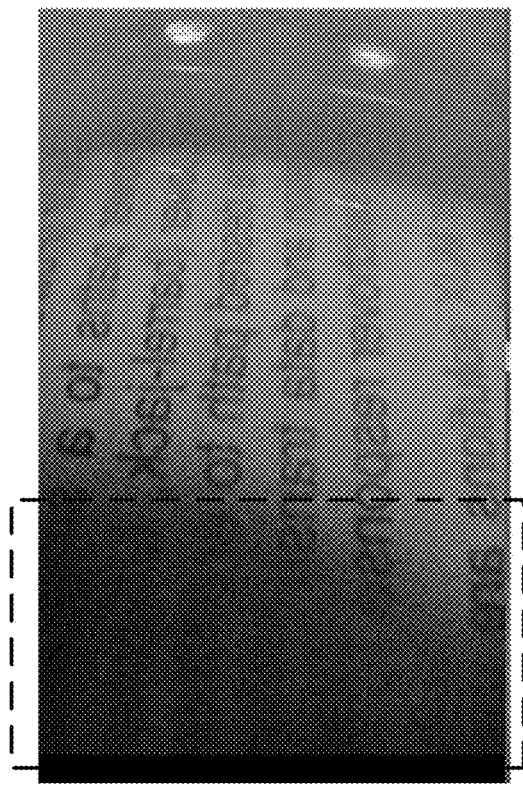
FIG. 12B illustrates a second image of the tracked object primarily generated based on the primary signal light, according to another embodiment of the present disclosure.
Figure 12C:
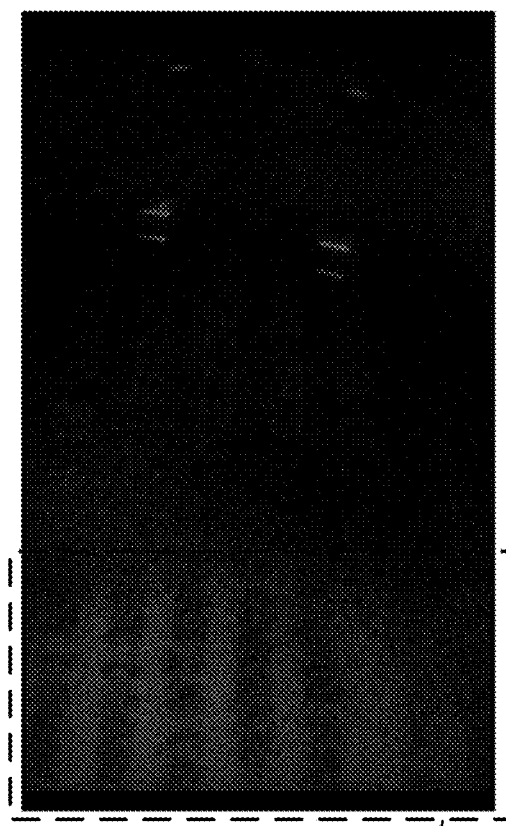
FIG. 12C illustrates a third image of the tracked object primarily generated based on the secondary signal light, according to another embodiment of the present disclosure.

For discussion purposes, the polarization converter 1190 may be an active polarization converter configured to convert an s-polarized light to a p-polarized light or vice versa when operating in an active state, and to maintain the polarization of an incident light when operating in a non-active state. The polarizer 1160 may be configured to block an s-polarized light and transmit a p-polarized light. FIGS. 12A-12C show a process of obtaining different perspective views of a tracked object. When the polarization converter 1190 is in the active state, the s-polarized lights 1150 and 1155 may be switched to p-polarized lights 1151 and 1156, which may be transmitted through the polarizer 1160 and be received by the optical sensor 110. The p-polarized portion of the unpolarized signal light 1175 may become an s-polarized signal light 1176, which may be blocked by the polarizer 1160, and the s-polarized portion of the unpolarized signal light 1175 may become a p-polarized light, which may be transmitted by the polarizer 1160 and be received by the optical sensor 110. Thus, when the polarization converter 1190 operates in the active state, the optical sensor 110 may receive both the s-polarized secondary signal lights and the s-polarized portion of the primary signal light. The optical sensor 110 may generate a first image based on a combination of the secondary signal lights and the primary signal light, as FIG. 12A shows. Here, the tracked target is a piece of paper with texts. As shown in FIG. 12A, the first image is a brighter image of the tracked target superimposed with a darker image that is shown in a dashed rectangular area 1210.

When the polarization converter 1190 operates in the non-active state, the s-polarized lights 1150 and 1155 in the secondary signal paths and the s-polarized portion of the unpolarized signal light 1175 in the primary signal path may be blocked (e.g., absorbed) by the polarizer 1160, while the p-polarized portion of the unpolarized signal light 1175 may be transmitted through the polarizer 1160 and received by the optical sensor 110. The optical sensor 110 may generate a second image of the tracked target based on the p-polarized portion of the unpolarized light 1175 in the primary signal path, as FIG. 12B shows. The dashed rectangular area 1210 in FIG. 12B indicates that the secondary signal light received by the optical sensor 110 is negligible, and the second image may be primarily based on the primary signal light.

Further processing may be performed on the first image that is generated primarily based on the primary signal light and the second image that is generated based on a mixture of the primary signal light and the secondary signal lights, such that a third image that is generated primarily based on the secondary signal lights may be obtained, as FIG. 12C shows, which enables a time-multiplexing multi-view eye-tracking. FIG. 12C shows a third image obtained through subtracting the first image shown in FIG. 12A by the second image shown in FIG. 12B. The first image, the second image, and the third image may include a plurality of first pixels, a plurality of second pixels, and a plurality of third pixels, respectively. The first pixels, second pixels and third pixels may be one-to-one corresponding to each other in position. The intensity of the third pixel may be equal to the intensity of the corresponding first pixel minus the intensity of the corresponding second pixel. FIG. 12C shows that the third image may be generated primarily based on the secondary signal light while the primary signal light received by the optical sensor 110 is negligible, because only the dashed rectangular area 1210 shows an image of the texts, while the other areas are almost black.

Thus, multiple perspective views of the tracked object, e.g., a first perspective view shown in FIG. 12B that is primarily generated based on the primary signal light, and a second perspective view shown in FIG. 12C that is primarily generated based on the secondary signal light may be obtained. The multiple perspective views of the tracked object may be used to extract more information of the target-tracking than a single perceptive view. As a result, the accuracy of the eye-tracking may be improved by utilizing the additional information obtained from the secondary signal light.

Figure 13:
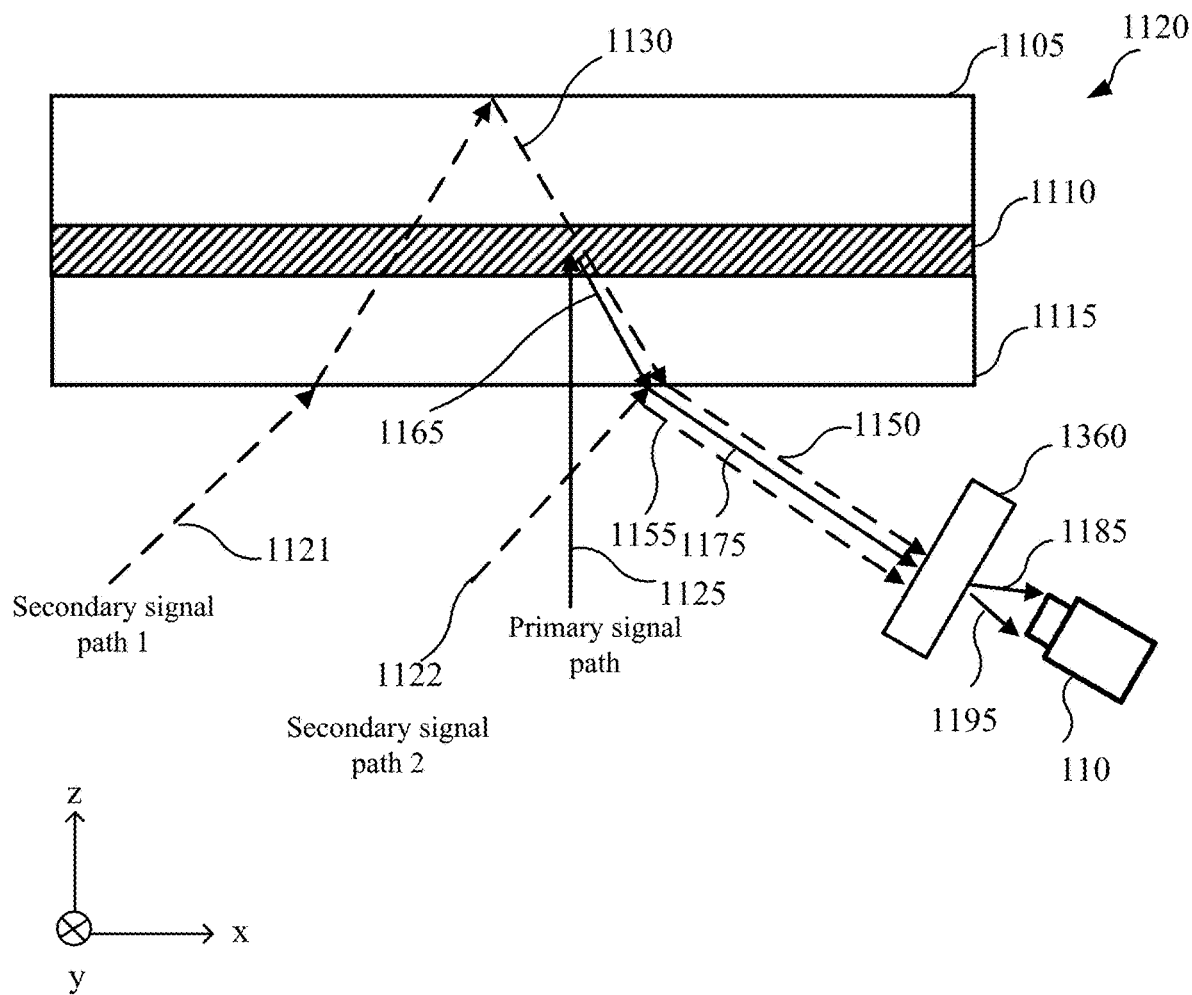
FIG. 13 illustrates a schematic diagram of an eye-tracking system, according to another embodiment of the present disclosure.

FIG. 13 illustrates a schematic diagram of an eye-tracking system 1300 with a polarization selective mechanism, according to another embodiment of the present disclosure. The eye-tracking system 1300 may include elements that are the same as or similar to those included in the eye-tracking system 500 shown in FIG. 5 and the eye-tracking system 1100 shown in FIG. 11. Descriptions of the same or similar elements are omitted. For example, the eye-tracking system 1300 may include a diffractive optical element 1120 that includes a HOE 1110 disposed between the first substrate 1105 and the second substrate 1115. The polarization selective mechanism may include a polarization selective steering assembly 1360 configured to steer incident lights of different polarizations to different detecting regions of the optical sensor 110. The polarization selective steering assembly 1360 may be similar to the polarization selective steering assembly 560 included in the embodiment shown in FIG. 5.

After propagating through the diffractive optical element 1120, the s-polarized light 1150 in the Secondary signal path 1, the s-polarized light 1155 in the Secondary signal path 2, and the unpolarized light 1175 in the Primary signal path may be incident onto the polarization selective steering assembly 1360. The unpolarized light 1175 may be decomposed into a first portion and a second portion having a substantially equal intensity but different polarizations, for example, an s-polarized portion and a p-polarized portion. For descriptive purposes, a sum of the s-polarized light 1150, the s-polarized light 1155, and the s-polarized portion of the unpolarized light 1175 is referred to as a third light, and the p-polarized portion of the unpolarized light 1175 is referred to as a fourth light.

The polarization selective steering assembly 1360 may be configured to steer incident lights of different polarizations to different detecting regions of the optical sensor 110. For example, the polarization selective steering assembly 1360 may steer the fourth light and the third light in different angles (or directions) to become a light 1185 having a positive steering angle and a light 1195 having a negative steering angle, respectively. The steering angle difference between the light 1185 and the light 1195 and/or the distance between the optical sensor 110 and the polarization selective steering assembly 1360 may be configured such that the light 1185 and the light 1195 may be received by different detecting regions of the optical sensor 110. The distance between the different detecting regions may be sufficiently large to be recognized by the optical sensor 110. The optical sensor 110 may generate a first image and a second image based on the light 1185 and light 1195, receptively. The first image generated based on the light 1185 may primarily include the information of the primary signal light. The first image and the second image may be processed to generate a third image that primarily includes the information of the secondary signal light. The processing of the images may refer to the above descriptions rendered in connection with FIGS. 12A-12C, which is not repeated here. Thus, the eye-tracking system 1300 may provide multiple perspective views of the eyes based on the primary signal light and secondary signal light, thereby enhancing the eye-tracking accuracy.

Figure 14:
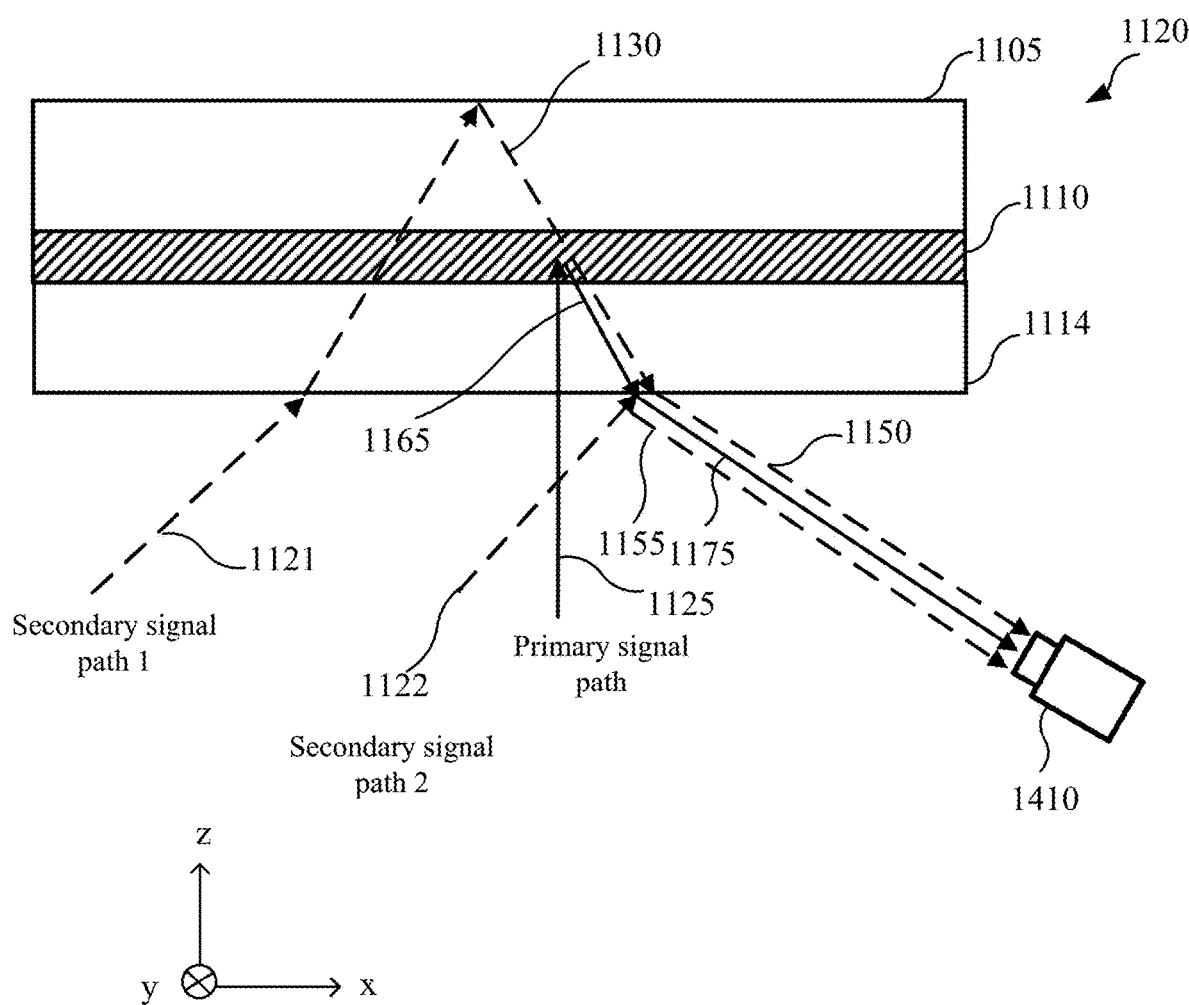
FIG. 14 illustrates a schematic diagram of an eye-tracking system, according to another embodiment of the present disclosure.

FIG. 14 illustrates a schematic diagram of an eye-tracking system 1400 with a polarization selective mechanism, according to another embodiment of the present disclosure. The eye-tracking system 1400 may include elements that are the same as or similar to those included in the eye-tracking system 900 shown in FIG. 9, and the eye-tracking system 1100 shown in FIG. 11. Descriptions of the same or similar elements are omitted.

The polarization selective mechanism of the eye-tracking system 1400 may include an optical sensor 1410, which may be a pixelated polarized camera similar to the pixelated polarized camera 910 in the eye-tracking system 900 shown in FIG. 9 and the pixelated polarized camera 1000 shown in FIG. 10. The pixelated polarized camera 1410 may be configured to receive the third light (i.e., the sum of the s-polarized light 1150, the s-polarized light 1155, and the s-polarized portion of the unpolarized light 1175) and the fourth light (i.e., the p-polarized portion of the unpolarized light 1175), by the photo diodes corresponding to the micropolarizers having the s-polarization orientation and the p-polarization orientation, respectively.

The pixelated polarized camera 1410 may generate a first image and a second image based on the fourth light and third light, receptively. The first image generated based on the fourth light may primarily include the information of the primary signal light. The first image and the second image may be processed to generate a third image that primarily includes the information of the secondary signal light. The processing of the images may refer to the above descriptions rendered in connection with FIGS. 12A-12C, which is not repeated here. Thus, the eye-tracking system 1400 may provide multiple perspective views of the eyes based on the primary signal light and secondary signal light, thereby enhancing the eye-tracking accuracy.

Figure 15A:
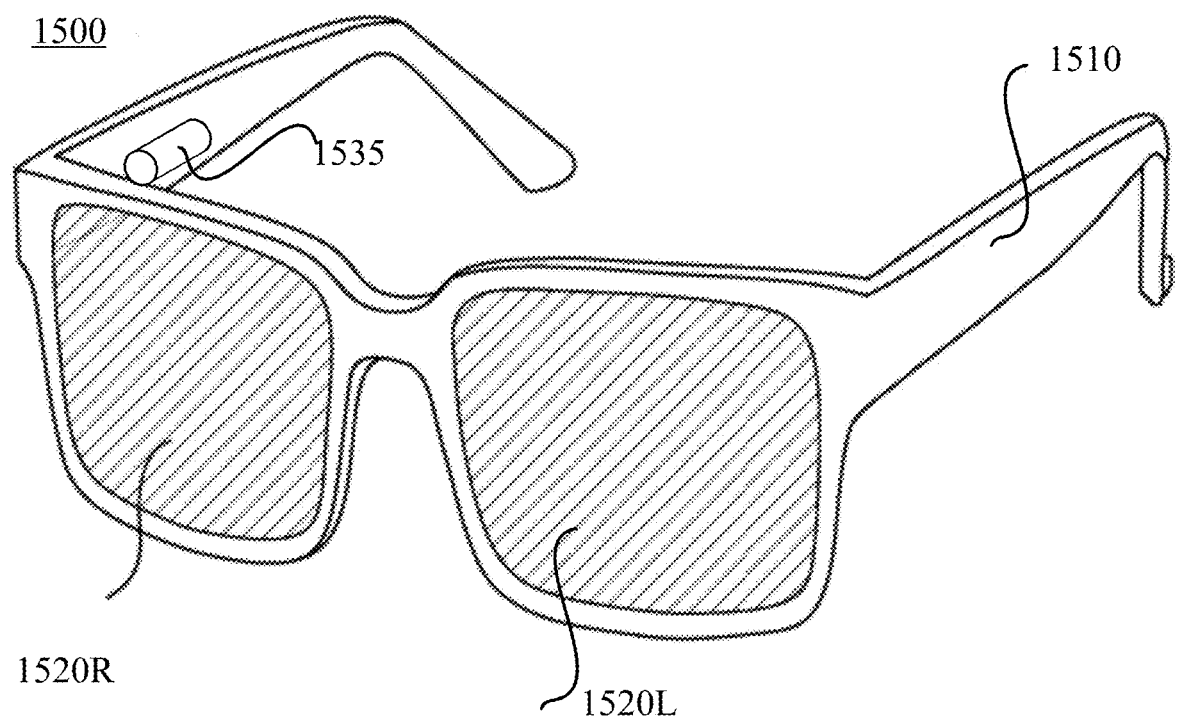
FIG. 15A is a schematic diagram of a NED, according to an embodiment of the disclosure.

FIG. 15A illustrates a schematic diagram of an NED 1500 according to an embodiment of the disclosure. In some embodiments, the NED 1500 may be referred to as a head-mounted display ("HMD"). The NED 1500 may be configured to present media content to a user. Examples of media content presented by the NED 1500 may include one or more images, video, audio, or a combination thereof. In some embodiments, audio is presented via an external device (e.g., speakers and/or headphones). The NED 1500 may function as a VR device, an AR device, an MR device, or a combination thereof. In some embodiments, when the NED 1500 may function as an AR or an MR device, portions of the NED 1500 and its internal components may be at least partially transparent.

Figure 15B:
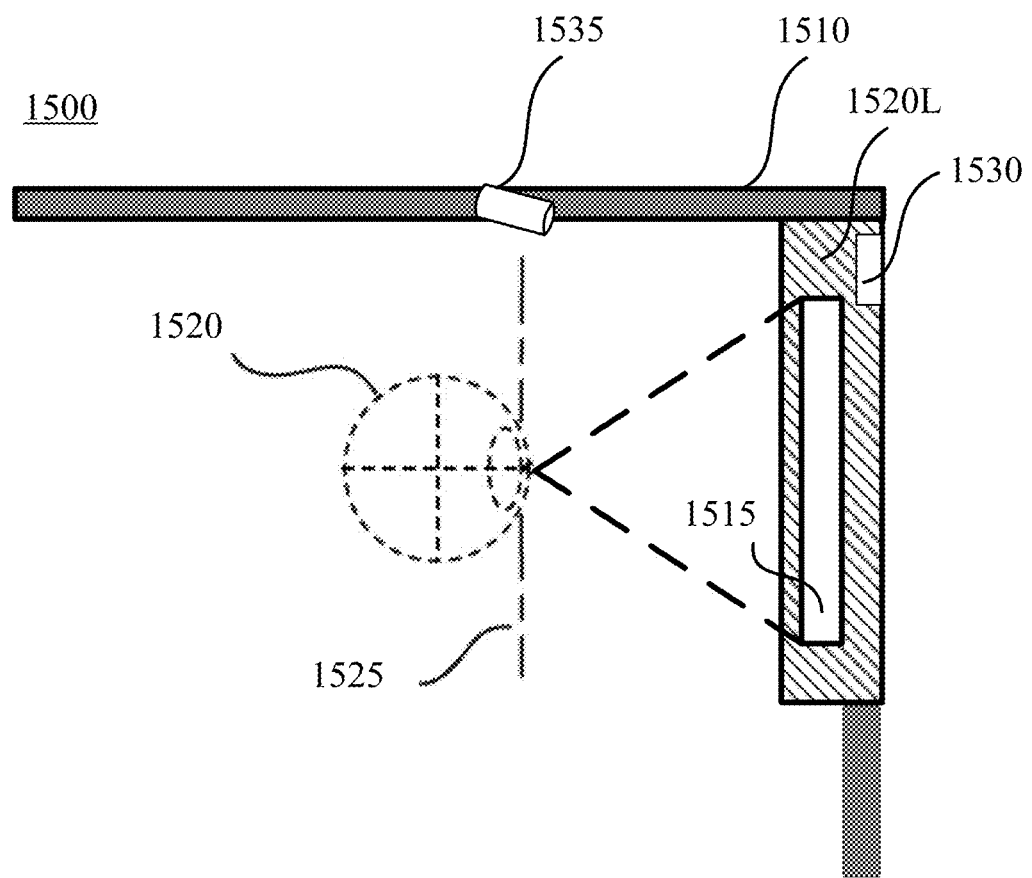
FIG. 15B is a cross sectional view of a half of the NED shown in FIG. 15A, according to an embodiment of the disclosure.

As shown in FIG. 15A, the NED 1500 may include a frame 1510, a left display system 1520L, a right display system 1520R, and an eye-tracking system (shown in FIG. 15B). In some embodiments, one or more devices shown in FIG. 15A may be omitted. In some embodiments, one or more additional devices or components not shown in FIG. 15A may also be included in the NED 1500. The frame 1510 may include a suitable type of mounting structure configured to mount the left display system 1520L and the right display system 1520R to a body part (e.g. a head) of the user (e.g., adjacent eyes of the user). The frame 1510 may be coupled to one or more optical elements, which may be configured to display media content to the user. In some embodiments, the frame 1510 may represent a frame of eye-wear glasses. The left display system 1520L and the right display system 1520R may be configured to enable the user to view virtual content presented by the NED 1500 and/or to view images of real-world objects. For example, in some embodiments, each of the left display system 1520L and the right display system 1520R may include a see-through optical element. In some embodiments, the left display system 1520L and the right display system 1520R may include any suitable display assembly (not shown) configured to generate an image light (representing a virtual image) and to direct the image light to an eye of the user. In some embodiments, the left display system 1520L and the right display system 1520R may each include a light source assembly 1535 configured to generate a virtual image (or an image light).

FIG. 15B is a cross-section view of a half of the NED 1500 shown in FIG. 15A according to an embodiment of the disclosure. For purposes of illustration, FIG. 15B shows the cross-sectional view associated with the left display system 1520L of the NED 1500. The cross-sectional view of the right display system 1520R may be similar to the cross-sectional view associated with the left display system 1520L. As shown in FIG. 15B, for an eye 1520, the left display system 1520L may include the light source assembly 1535 for generating an image light (e.g., a visible image light representing a virtual image) and a light guide (or waveguide) display assembly 1515 for delivering the image light generated by the light source assembly 1535 to the eye 1520. An exit pupil 1525 may be a location where the eye 1520 is positioned in an eye-box region when the user wears the NED 1500.

In some embodiment, the light source assembly 1535 may include a light source (e.g., a projector) configured to emit the image light and an optical conditioning device configured to condition (e.g., including collimating, polarizing, etc.) the image light. In some embodiments, the light guide display assembly 1515 (or waveguide display assembly 1515) may include a light guide (or waveguide) or a stack of light guides. The light guide display assembly 1515 may also include one or more in-coupling elements coupled to the light guide(s) and configured to couple the image light generated by the light source assembly 1535 into a total internal reflection ("TIR") path inside the light guide(s). The light guide display assembly 1515 may also include one or more out-coupling elements coupled to the light guide(s) and configured to couple the image light propagating in the TIR path out of the light guide(s), toward the eye 1520. For illustrative purposes, FIG. 15B shows the cross-sectional view associated with a single eye 1520 and a single light guide display assembly 1515. In some embodiments, another light guide display assembly that is separate from and similar to the light guide display assembly 1515 shown in FIG. 15B may be included in the NED 1500 to provide an image light to an exit pupil of another eye of the user. In some embodiments, a light source assembly similar to the light source assembly 1535 may be disposed at the other half of the NED 1500.

The NED 1500 may include one or more optical elements between the light guide display assembly 1515 and the eye 1520. The optical elements may be configured to, e.g., correct aberrations in an image light emitted from the light guide display assembly 1515, magnify an image light emitted from the light guide display assembly 1515, or perform another type of optical adjustment to an image light emitted from the light guide display assembly 1515.

In some embodiments, the eye-tracking system 1530 may be mounted to the frame 1505. In some embodiments, the eye-tracking system 1530 may be separate from the frame 1505. The eye-tracking system 1530 may include be an embodiment of any of the disclosed eye-tracking systems, such as the eye-tracking system 400, 500, 900, 1100, 1300, or 1400. With the eye-tracking system 1530, multiple perspective views of the eye may be provided by the NED 1500, which enhances the accuracy of the eye-tracking. Information obtained during eye tracking may be used for determining the type of information to be presented to the user of the NED 1500 and/or the arrangement of the displayed content on a display screen of the NED 1500, addressing the vergence-accommodation conflict, and improving display quality and performance of the NED 1500. Accordingly, the user experience of the NED 1500 may be enhanced.

In some embodiments, the NED 1500 may include an adaptive dimming device, which includes a global or local dimming element. In some embodiments, the dimming element may be electrically or optically tunable. The dimming element may dynamically adjust the transmittance of the see-through view of the real-world environment observed through the NED 1500, thereby switching the NED 1500 between a VR device and an AR device or between a VR device and an MR device. In some embodiments, along with switching between the AR/MR device and the VR device, the dimming element may be used in the AR device to mitigate differences in brightness of the see-through view (e.g., real-world image) and the virtual image. In some embodiments, the dimming element may dynamically attenuate a light from the real-world environment depending on brightness of the real-world environment, thereby adjusting the brightness of the see-through view.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a non-transitory computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system, comprising:
   a diffractive optical element including at least one substrate and a grating structure, the grating structure being configured to diffract a first light having an incidence angle within a predetermined range, and the at least one substrate being configured to reflect a second light; and
   a polarization selective mechanism including an optical sensor, and configured to receive the first light diffracted by the diffractive optical element and the second light reflected by the at least one substrate, and generate images based on the first light and the second light, respectively.

2. The system of claim 1, wherein the first light and the second light have different polarizations.

3. The system of claim 1, wherein the optical sensor is configured to generate a first image and a second image based on the first light and the second light, respectively.

4. The system of claim 3, wherein the polarization selective mechanism further comprises a polarization converter and a polarizer arranged in an optical series, the polarization converter and the polarizer together being configured to alternately transmit the first light and the second light toward the optical sensor in a time-multiplexing manner.

5. The system of claim 3, wherein the polarization selective mechanism further comprises a polarization selective steering assembly configured to steer the first light and the second light to different detecting regions of the optical sensor.

6. The system of claim 5, wherein the polarization selective steering assembly comprises at least one liquid crystal ("LC") steering element.

7. The system of claim 6, wherein the at least one LC steering element comprises one of an optical phased array ("OSA"), a switchable Bragg grating, an index matched surface relief grating, or a Pancharatnam-Berry Phase ("PBP") grating.

8. The system of claim 3, wherein:
   the optical sensor comprises a pixelated polarized camera that includes a micro-lens array, a micro-polarizer array including a plurality of micro-polarizers of different polarization orientations, and a photo diode array including a plurality of photo diodes arranged in an optical series, and
   the pixelated polarized camera is configured to receive the first light by a first plurality of photo diodes corresponding to a first plurality of micro-polarizers having a first polarization orientation, and receive the second light by a second plurality of photo diodes corresponding to a second plurality of micro-polarizers having a second polarization orientation different from the first polarization orientation.

9. The system of claim 1, wherein:
   the optical sensor is configured to receive a third light and a fourth light output from the diffractive optical element,
   the third light comprises a first portion of the first light, and the fourth light comprises the second light and a second portion of the first light,
   the second portion of the first light has a same polarization as the second light, and
   the third light and the fourth light have different polarizations.

10. The system of claim 9, wherein:
    the optical sensor is configured to generate a first image and a second image based on the third light and the fourth light, respectively, and generate a third image based on an intensity difference between corresponding pixels of the first image and the second image.

11. The system of claim 9, wherein the polarization selective mechanism further comprises a polarization converter and a polarizer arranged in an optical series, the polarization converter and the polarizer together being configured to alternately transmit the third light and the fourth light toward the optical sensor in a time-multiplexing manner.

12. The system of claim 9, wherein the polarization selective mechanism further comprises a polarization selective steering assembly configured to steer the third light and the fourth light to different detecting regions of the optical sensor.

13. The system of claim 9, wherein:
the optical sensor comprises a pixelated polarized camera that includes a micro-lens array, a micro-polarizer array including a plurality of micro-polarizers of different polarization orientations, and a photo diode array including a plurality of photo diodes arranged in an optical series, and
the pixelated polarized camera is configured to receive the third light by a first plurality of photo diodes corresponding to a first plurality of micro-polarizers having a first polarization orientation, and receive the fourth light by a second plurality of photo diodes corresponding to a second plurality of micro-polarizers having a second polarization orientation different from the first polarization orientation.

14. The system of claim 2, wherein the second light is a substantially s-polarized light.

15. The system of claim 1, wherein the predetermined range is about 0 degree to 35 degrees.

16. The system of claim 1, wherein the diffractive optical element comprises a polarization selective grating.

17. The system of claim 16, further comprising:
a quarter-wave plate configured for an infrared spectrum, and disposed between the polarization selective grating and the polarization selective mechanism.

18. A system, comprising:
a light source configured to emit a light to illuminate an object;
a diffractive optical element including at least one substrate and a grating structure, wherein the grating structure is configured to diffract a first light reflected from the object and having an incidence angle within a predetermined range, and the at least one substrate is configured to reflect a second light reflected from the object; and
a polarization selective mechanism including an optical sensor, and configured to receive the first light diffracted by the diffractive optical element and the second light reflected by the at least one substrate, and generate images of the object based on the first light and the second light, respectively.

19. The system of claim 18, wherein the first light and the second light having different polarizations.

20. The system of claim 18, further comprising:
a quarter-wave plate configured for an infrared spectrum, and disposed between the diffractive optical element and the polarization selective mechanism.

* * * * *